United States Patent
Arms et al.

(10) Patent No.: US 7,639,135 B2
(45) Date of Patent: Dec. 29, 2009

(54) IDENTIFYING SUBSTANTIALLY RELATED OBJECTS IN A WIRELESS SENSOR NETWORK

(75) Inventors: Steven Willard Arms, Williston, VT (US); Christopher Townsend, Shelburne, VT (US); David Lawrence Churchill, Burlington, VT (US)

(73) Assignee: MicroStrain, Inc., Williston, VT (US)

( * ) Notice: Subject to any disclaimer, the term of this patent is extended or adjusted under 35 U.S.C. 154(b) by 589 days.

(21) Appl. No.: 11/260,837

(22) Filed: Oct. 27, 2005

(65) Prior Publication Data

US 2006/0103534 A1    May 18, 2006

Related U.S. Application Data

(60) Provisional application No. 60/623,119, filed on Oct. 28, 2004.

(51) Int. Cl.
*G01P 15/00* (2006.01)
*G06F 7/08* (2006.01)

(52) U.S. Cl. ............ 340/572.1; 340/573.1; 340/539.11; 340/686.6; 340/539.23; 702/141; 700/115; 700/213; 700/224

(58) Field of Classification Search .............. 340/572.1, 340/572.4, 573.1, 539.13, 10.1, 539.21, 539.23, 340/686.6; 235/375, 385, 492; 382/103
See application file for complete search history.

(56) References Cited

U.S. PATENT DOCUMENTS

| | | | | |
|---|---|---|---|---|
| 5,804,810 | A * | 9/1998 | Woolley et al. | ............. 235/492 |
| 6,204,813 | B1 | 3/2001 | Wadell | |
| 6,496,806 | B1 * | 12/2002 | Horwitz et al. | ............... 705/28 |
| 6,529,127 | B2 | 3/2003 | Townsend | |
| 6,654,481 | B2 * | 11/2003 | Amemiya et al. | ........... 382/103 |
| 6,784,826 | B2 | 8/2004 | Kane | |
| 6,873,259 | B2 * | 3/2005 | Teraura | .................... 340/572.1 |
| 6,996,402 | B2 * | 2/2006 | Logan et al. | ............. 455/456.1 |
| 7,072,789 | B2 * | 7/2006 | Vock et al. | .................. 702/141 |
| 7,123,126 | B2 * | 10/2006 | Tanaka et al. | ................. 340/5.2 |
| 7,123,151 | B2 * | 10/2006 | Garber et al. | ............ 340/572.4 |
| 7,187,278 | B2 * | 3/2007 | Biffar | .................... 340/539.13 |
| 7,242,306 | B2 * | 7/2007 | Wildman et al. | ......... 340/573.1 |
| 7,248,933 | B2 * | 7/2007 | Wildman | ..................... 700/90 |
| 2002/0024450 | A1 | 2/2002 | Townsend | |
| 2003/0105403 | A1 | 6/2003 | Istvan | |
| 2004/0078662 | A1 | 4/2004 | Hamel | |
| 2004/0113790 | A1 | 6/2004 | Hamel | |
| 2005/0017602 | A1 | 1/2005 | Arms | |
| 2005/0105231 | A1 | 5/2005 | Hamel | |

OTHER PUBLICATIONS

Romy Malan, "Here Come Wireless Sensors," Machine Design, May 6, 2004.

Roger O. Crockett, "No wires, no Rules," Business Week, Apr. 26, 2004.

* cited by examiner

*Primary Examiner*—Davetta W Goins
*Assistant Examiner*—Anne V Lai
(74) *Attorney, Agent, or Firm*—James Marc Leas

(57) ABSTRACT

Substantially related objects are identified by providing a first wireless sensing device having a first sensor and providing a second wireless sensing device having a second sensor. Next, comparing data derived from the second sensor with data derived from the first sensor to determine whether data from the first sensor is substantially related to data from the second sensor. The first wireless sensing device is identified as substantially related to the second wireless sensing device if data derived from the first sensor is substantially related to data derived from the second sensor.

59 Claims, 12 Drawing Sheets

COMPARISON LINKED VERSUS UNLINKED

IDENTIFYING SUBSTANTIALLY RELATED OBJECTS IN A WIRELESS SENSOR NETWORK

This application claims priority of Provisional Patent Application 60/623,119, filed Oct. 28, 2004, incorporated herein by reference.

FIELD

This application generally relates to wireless networks. More particularly it relates to wireless networks of objects that include sensors. More particularly it relates to a system for identifying substantially related objects within a wireless sensor network of objects.

BACKGROUND

Bar codes, RFID tags, and other wireless identification and communication schemes have been widely used to identify individual merchandise or other objects. RFID tags and other wireless identification networks have also been proposed or used for tracking and controlling inventory as it enters and leaves a store or warehouse. They have also been used for tracking inventory as it moves from one location to another within a production line. Recently the electronic product code (EPC) has been adopted for RFID applications. EPC is a 92 bit ID code which allows specific objects to be identified.

Wireless sensor nodes have been proposed or used for monitoring conditions such as temperature, humidity, displacement, acceleration, and strain in structures, such as bridges, roads, vehicles, buildings, and rotating parts, as described in commonly assigned patent application Ser. No. 09/731,066, "Data Collection and Storage Device" to Christopher P. Townsend, et al.; U.S. Pat. No. 6,529,127, "System for Remote Powering and Communication with a Network of Addressable Multichannel Sensing Modules," to Seven W. Arms, et al.; U.S. patent application Ser. No. 10/668,827, "Remotely Powered and Remotely Interrogated Wireless Digital Sensor Telemetry System," to Michael John Harnel, et al.; U.S. patent application Ser. No. 10/379,223, "Energy Harvesting for Wireless Sensor Operation and Data Transmission," to Michael John Hamel, et al.; and U.S. patent application Ser. No. 10/769,642, "Shaft Mounted Energy Harvesting for Wireless Sensor Operation and Data Transmission," to Steven Arms, et al., all of which are incorporated herein by reference. The 1024-041 application shows the idea of a network of addressable sensors. The 115-008 and 115-014 applications show energy harvesting systems for addressable wireless sensor nodes. Wireless sensor nodes have also been proposed or used for monitoring vehicles and industrial equipment to provide condition based maintenance.

However, all of these systems have treated each bar code, RFID tag, or wireless sensor node as an individual entity. None of the systems so far proposed have been satisfactory in efficiently providing information about which objects of a large collection of potentially disconnected objects are grouped together in some fashion to form a subgroup. A bar code scanner or a token has been needed to identify members of a group. But none of these methods allow automatic grouping. For example, none of the previous systems has been able to efficiently and automatically provide information about which objects remain in the same shipping container and distinguish from other nearby objects that are not in that container and from other objects that have been removed from the container. Nor have previous systems been able to automatically detect which of many machine parts are attached to a machine. Thus, a better system for detecting subgroups of wireless sensor nodes that share some common feature is needed, and this solution is provided by the following.

SUMMARY

One aspect of the present patent application is a method of detecting substantially related objects by providing a first wireless sensing device having a first sensor and providing a second wireless sensing device having a second sensor. Data derived from the second sensor is compared with data derived from the first sensor to determine whether data derived from the first sensor is substantially related to data derived from the second sensor. The first wireless sensing device is identified as substantially related to the second wireless sensing device if data derived from the first sensor is substantially related to data derived from the second sensor.

BRIEF DESCRIPTION OF THE DRAWINGS

The foregoing and other features will be apparent from the following detailed description as illustrated in the accompanying drawings, in which.

DETAILED DESCRIPTION

Figure 1:
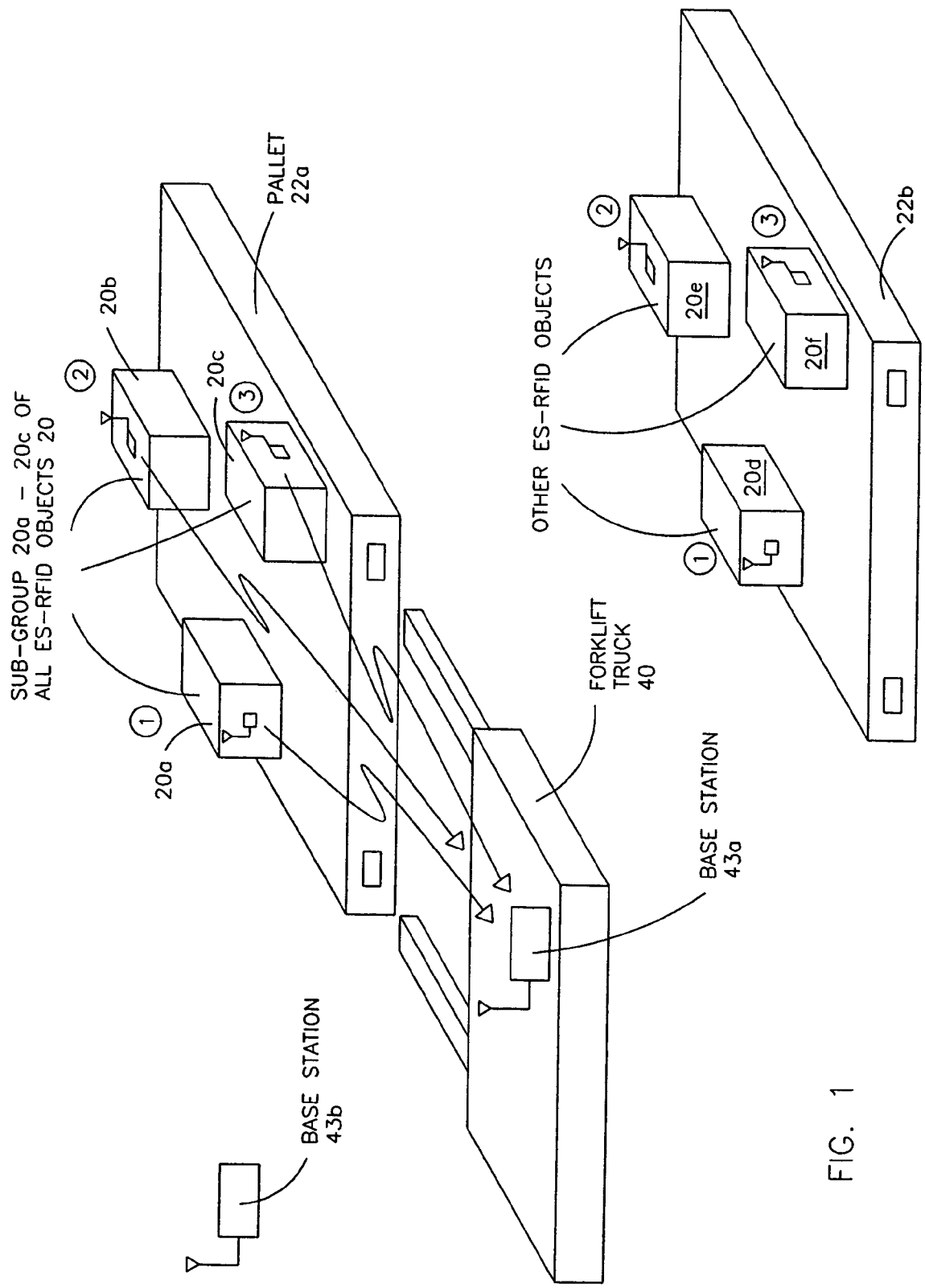
FIG. 1 is a three dimensional view of first and second level base stations that receive data from objects having a enhanced sensing radio frequency identification system (ES-RFID) in which a subgroup of the objects are moving together and experiencing substantially related acceleration data and other objects are not moving with this subgroup.

The present inventors recognized that wireless communication devices with ID codes and sensors provided the opportunity not just to identify the objects to which they are attached but to group objects based on related sensor data, such as the objects presently located in the same shipping container. They also recognized that the same system could be used to determine the order of objects having an ordered relationship such as the ordering of cars in a railroad train. They also recognized that the same system could detect nearest neighbors in an array of objects. To accomplish these tasks the present inventors devised several schemes for collecting sensor data from multiple objects and using that data to distinguish those whose sensors detect related sensor data. The grouping, ordering, or relationship determination is based on the finding of related sensor data.

For example, objects having accelerometers experiencing related accelerations may identify the objects as located on the same moving vehicle. The accelerations could be nearly identical for objects located on a rigid platform. They could, for example, differ in timing, phase, or magnitude for objects located on different parts of the same non-rigid moving platform and experiencing different damping, but nevertheless be substantially related. Objects having strain sensors experiencing similar strain patterns may be identified as located on the same spinning shaft. Objects having sensors showing a similar pattern of gradual heating above a given temperature may identify them as being located in the same failing refrigerator. Objects having sensors showing common changes in acceleration or angular rate may identify them as members of a group of accelerating or moving objects.

The present patent application is particularly useful for identifying groupings of objects that have a property that is changing over time. The present application can also follow the changes in groupings as one or more objects leave a group, for example, while others enter the group. As conditions dynamically change the present application can continuously identify as members of a subgroup those objects whose sensors all show related changes in measurement, and thus continuously detect any changes in membership. For example, by monitoring acceleration the system can identify a group including all objects being moved by a forklift, and it can continually track the different groups of objects as they are sequentially moved by the forklift.

The acceleration data can be also be used to identify an ordering of objects within a group. For example, the order of railroad cars in a train can be identified by the timing as each car sequentially roles over the same joint, bump or switch that provides closely related data to accelerometers located on each car of the train. In this case the acceleration signatures are related at corresponding times when each car of the train rolls over the same joint, bump or switch. The related data from each car identifies them as all members of the subgroup of cars belonging to the same train, and the order of times for sensing identifies nearest neighbors and the ordering of those cars in the train.

The enhanced sensing radio frequency identification system (ES-RFID) of the present patent application at least includes an identity (ID) code, a communication system, and a sensor for each object. Preferably the carrier for the ES-RFID electronic system for each object also includes a controlling circuit, which may be a dedicated control circuit or a software programmable circuit, such as a microprocessor.

The object can be any item, such as merchandise, a vehicle, a component, a document, produce, a person, an animal, or another living thing. The identity code can be a code, such as a unique number stored in a memory device, such as a non-volatile memory. It can also be a bar code pattern. The communication system can be of any type, such as a wireless RF transmitter, an IR transmitter, an inductance coil, or a sound generator. The sensor can detect a parameter, such as acceleration, weight, strain, vibration, temperature, pressure, humidity, magnetic field (including intensity, frequency, or direction) or color. The ID code, communication system, and sensor can all be located on a carrier mounted on the object, such as a printed circuit board. The identification and communication system can be an RFID device that is powered from inductive coupling when a reader or base station is close. The carrier may also include an onboard source of power to provide sufficient energy to the transmitter to transmit the identity code a desired distance, which may be measured in feet, tens of feet, hundreds of feet, or further. The source of power can be a battery, capacitor, or fuel cell. It can also include an energy harvesting system, as described in the 115-008 and 115-014 applications.

In one embodiment the sensor detects accelerations and can be used to detect objects moving on the same platform or vehicle. The platform or vehicle can be of any type, such as a briefcase or other bag, a cart, a wheelbarrow, a baby carriage, a bicycle, a motor vehicle, a trailer for attaching to another vehicle, a truck, a railroad car, a fork lift truck, or earth moving equipment. The system of the present patent application can also detect objects moving together that are not on a common platform or vehicle such as pages of documents that are carried by hand, or so-called smart dust that may be dropped from an airplane. Documents can each have what the present inventors call a "smart staple" which is a ES-RFID electronic system that attaches to each of the documents. The smart staple includes the ID code, the communications device, and a sensor. Any ordinary object can be made into a ES-RFID object by providing, for example an RFID chip with a sensor.

The sensor of the ES-RFID object senses a condition the ES-RFID object experiences or finds in its environment. The sensor can also detect a change in such a condition. The transmitter can be used to communicate the identity code and/or the sensor data of that ES-RFID object. The ES-RFID object may also have a receiver for receiving instructions such as triggering data acquisition or transmission. The receiver can also be for receiving data from another sensor for onboard comparison. The ES-RFID object may also have other electronics, including signal conditioning, a/d converter, microprocessor, and power supplies. The ES-RFID object may also include other electronic devices or an actuator to accomplish a task.

A common condition may be provided to a subgroup of the ES-RFID objects. The condition may, for example, be a movement to a platform on which a subgroup of ES-RFID objects may be located. The sensor may be an accelerometer that can detect an acceleration in each ES-RFID object that is part of the movement. The present inventors recognized that a subgroup of ES-RFID objects moving together on a common platform can be identified since their sensors will all detect common or related accelerations from their common movement, and their transceivers can share identity codes of all those sharing this same or related acceleration pattern.

Figure 2:
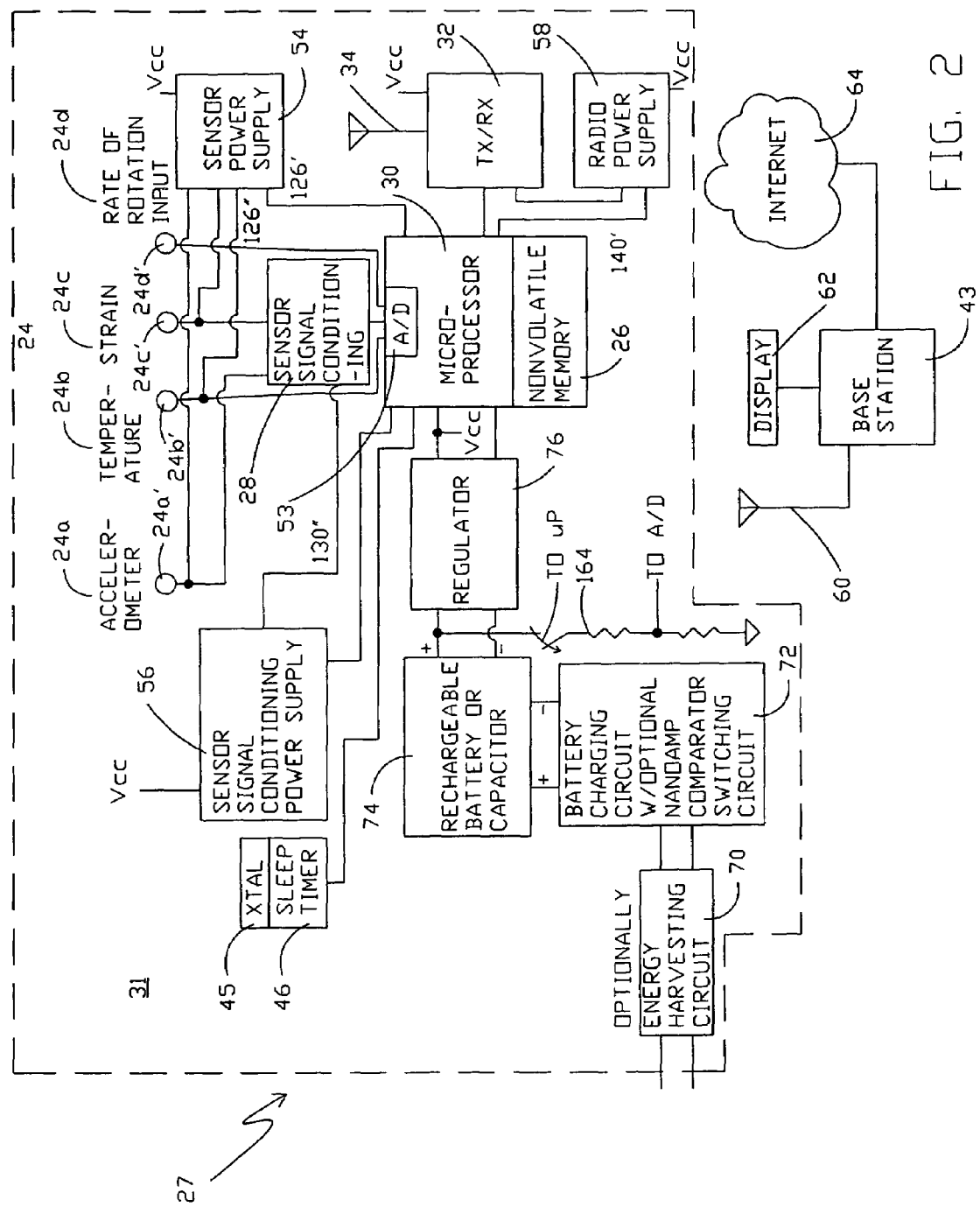
FIG. 2 is a block diagram of the electronics of a ES-RFID object showing how ID storage, sensing, processing, transmission, and power are provided as it communicates with a base station, and showing how the base station may include a display and communicate externally via the internet.
Figure 3:
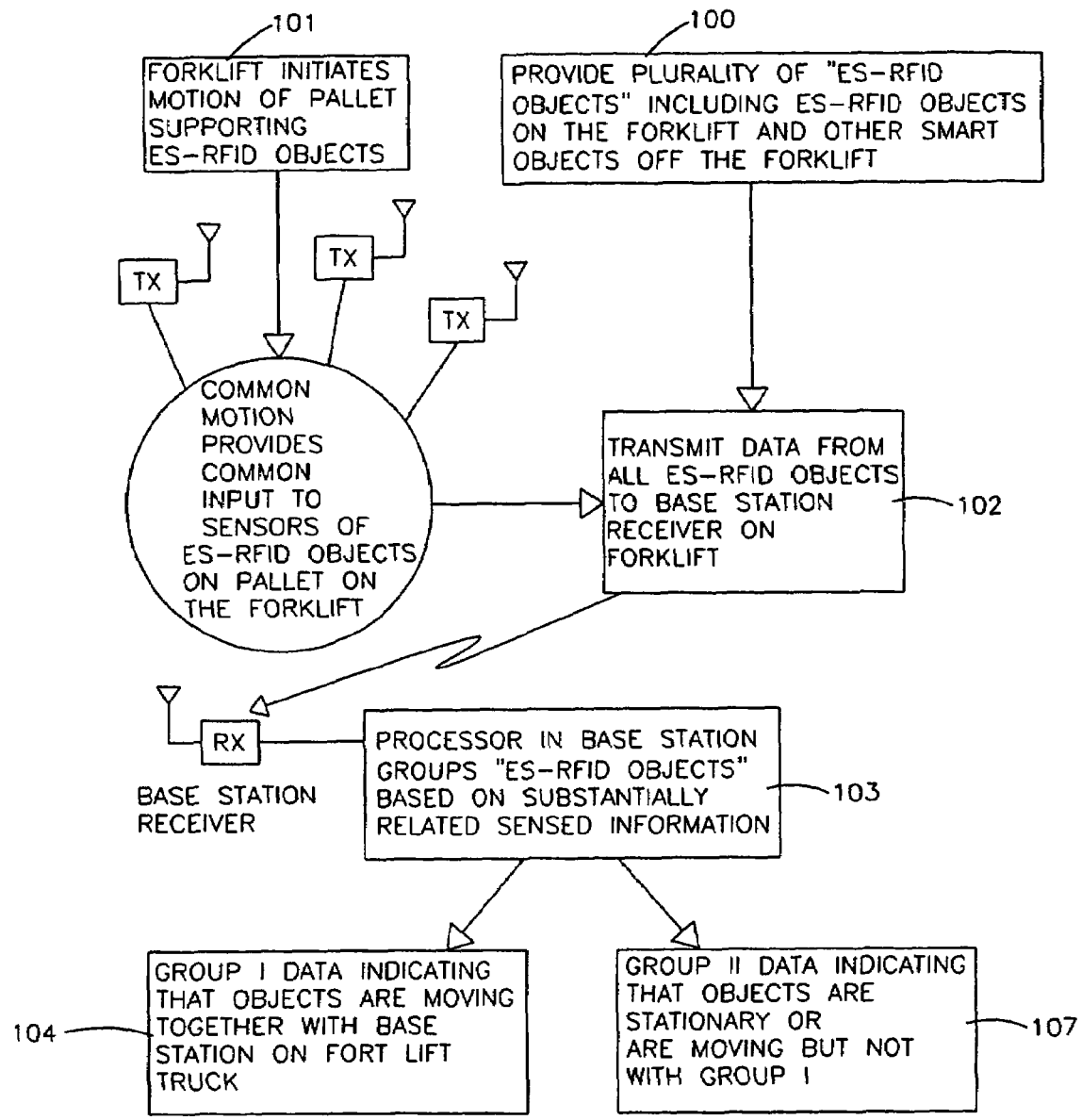
FIG. 3 is a flow chart of one embodiment of the present patent application to distinguish objects moving with a fork lift from those not moving with the fork lift.

In one embodiment, subgroup 20a-20c of all ES-RFID objects 20 are on pallet 22, as shown in FIG. 1. Each ES-RFID object 20a-20c transmits data derived from one or more of its own sensors 24a-24d, along with its own ID code, as shown in FIG. 2 and in the flow chart in FIG. 3. ES-RFID objects 20a-20c may be boxes of merchandise on pallet 22, as shown in FIG. 1. They may also be, for example, produce or farm animals in a railroad car, machinery on a truck, children on a bus, or any other items on a moveable platform.

Sensor 24a-24d may for example, detect acceleration, angular acceleration, tilt, rate of rotation, velocity, displacement, location, compass heading, pitch, roll, altitude, depth, strain, vibration, or be any other indicator of movement for distinguishing objects sharing the same or similar movement.

A condition other than movement, such as temperature, pressure, humidity, light, an RF signal, another electromagnetic signal, a voltage, a magnetic field, sound, pressure, or presence of a chemical, or a change in any of these parameters, can also be monitored by a corresponding sensor for that parameter.

Subgroups are identified as members having substantially related data at a single point in time, at corresponding points in time, during a time frame, or during corresponding time frames. Corresponding points in time or corresponding time frames may be provided for different ES-RFID objects where delay is experienced between corresponding inputs to those ES-RFID objects. For example, accelerations above each set of wheels of a truck provided by a single bump in a road may occur in different but corresponding time frames.

The data indicating membership in a subgroup can be identical within a tolerance for all members of the subgroup. For example, members of a subgroup may have data for any of the sensed parameters that lie within a given range of values. The data for members of the subgroup may be otherwise related, with variation from member to member given by some relationship. For example, pressure data for a subgroup of objects that are all tied to an anchor chain extending from a buoy under water at different depths may provide differences in pressure data corresponding to their depth along the chain. This variation in related data can also allow ordering the ES-RFID objects, determination of nearest neighbors, and identification of subgroups of ES-RFID objects.

The subgroup can include only one person or object. For example, a scale of the present patent application may identify which of a large group of people is standing on the scale as well provide that person's weight. If the scale and the people have ES-RFID electronic systems of the present application, the identification of the particular person on the scale and her weight can be recorded. The ES-RFID electronic system, including accelerometers are carried, for example, in a bracelet on the person. The ES-RFID electronic system located on a particular person stepping on the scale will record substantially related acceleration data with accelerometers located in the scale during that stepping process. That person's identity is then stored with the weight found by the scale. Wireless communications between the two allow the data to be stored in a storage device associated with the scale or in a storage device on the bracelet traveling with the person. The scale can also be part of a network, and data can be stored on a server or other memory device wired or wirelessly connected to the network. Weight data collected over time may be important for tracking the weight gain or loss of the person being weighed, and this historical data may be important for maintenance of health of the person. Weight data for that person can also be stored in memory on the scale. It can also be stored in memory on the bracelet traveling with the person.

An ID code for each ES-RFID object 20a-20c is stored in nonvolatile memory 26 within electronic system 27 of each ES-RFID object 20a-20c. Nonvolatile memory 26 can be flash memory, EEPROM, magnetic or optical disk storage, or any other type of non-volatile memory.

Data from sensor 24 is processed in signal conditioning 28 and microprocessor 30, both located on the same circuit board 31 as non-volatile memory 26. Microprocessor 30 such as the PIC 18C series from Microchip, Chandler, Ariz. with onboard A/D converter and nonvolatile memory and flash reprogrammability can be used. Signal conditioning 28 can be an amplifier stage such as the AD623 instrumentation amplifier. Signal conditioning includes amplifying a low level signal from sensor 24 and filtering out noise. Signal conditioning also regulates power and can also allow for offset and gain adjustment, or self-calibration of sensor 24, as shown in Ser. No. 10/769,642. Additional external non-volatile memory can also be provided.

Information, such as data and ID codes, are transmitted by ES-RFID objects 20a-20c through each ES-RFID object's transmitter/receiver 32 connected to antenna 34, as shown in FIG. 2. Transmitter/receiver 32 can be a transceiver or there may be separate transmitter and receiver devices.

In one embodiment, many ES-RFID objects 20 are provided, including ES-RFID objects 20a-20c mounted on pallet 22a that is about to be moved by forklift truck 40. ES-RFID objects 20 also include other ES-RFID objects 20d, 20e, 20f on pallet 22b that is being left alone by fork lift truck 40, as shown in FIG. 1 and in box 100 of the flow chart in FIG. 3.

Next, forklift truck 40 initiates motion of pallet 22a and ES-RFID objects 20a-20c mounted on pallet 22a, as shown in box 101. This movement by fork lift truck 40 provides a similar or at least a related acceleration input to each sensor 24a on each ES-RFID object 20a-20c mounted on pallet 22a.

When, in box 102, accelerometer data is transmitted by each ES-RFID object 20 in the warehouse to base station 43a, processor 44 in base station 43a compares data and determines subgroups of ES-RFID objects in which at least one ES-RFID object has acceleration data that is substantially related to acceleration data of another ES-RFID object, as shown in box 103.

Base station 43a can include the circuitry shown for electronic system 27 in FIG. 2. It includes nonvolatile memory 26 for storing data received from ES-RFID objects, microprocessor 30, and transmitter/receiver 32. Microprocessor 30 or a personal computer to which base station 43a is wired or wirelessly connected can be used to run a program for comparing data from ES-RFID objects for determining which are members of the same subgroup. A microprocessor and programmability is not essential; base station 43a can have hard wired logic for performing the comparisons. Base station 43a can also have its own sensors, such as those sensors 24a-24d shown for electronic system 27 in FIG. 2. It can also have power supplies, regulators, signal conditioning, energy harvesting, and other circuits as shown for electronic system 27 in FIG. 2.

Figure 4:
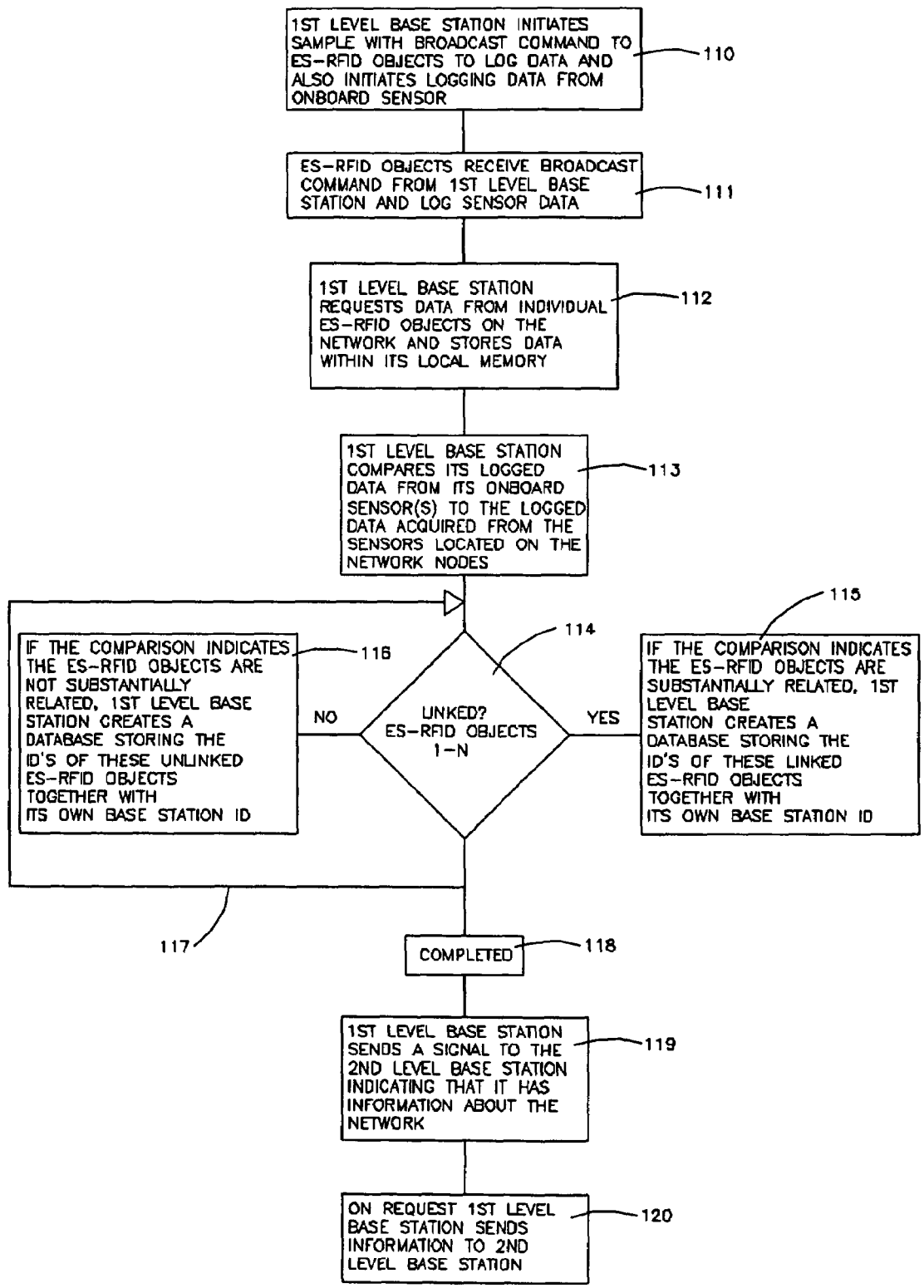
FIG. 4 is a flow chart of another embodiment for providing a data base of objects that are substantially related and a data base of objects that are not substantially related.

In one embodiment sampling is initiated in first level base station 43a, which wirelessly broadcasts a command to log data to all ES-RFID objects, as shown in box 110, as shown in FIG. 4. All ES-RFID objects 20 receive the broadcast command and log sensor data, as shown in box 111. Next first level base station 43a requests data from individual ES-RFID objects 20 on the network, and this data is sent one at a time, as shown in box 112. First level base station 43a then compares its logged data from its on board sensors with data in receives from sensors located on ES-RFID objects 20, as shown in boxes 113 and 114. If the comparison indicates that a ES-RFID object has substantially related data to data in base station 43a then first level base station 43a creates a first list or data base of ID's of the linked ES-RFID objects 20 with its own base station ID, as shown in box 115. If the comparison indicates that ES-RFID objects 20 do not have data that is substantially related to data acquired by base station 43a then first level base station 43a creates a second list or data base of the unlinked ES-RFID objects 20, as shown in box 116. This process is repeated for all ES-RFID objects communicating with base station 43a as shown by arrow 117, until all ES-RFID objects communicate, as shown in box 118.

Next, first level base station 43a sends a signal to second level base station 43b indicating that it has information about ES-RFID objects 20 on the network, as shown in box 119. On request from second level base station 43b, first level base station 43a sends its information to second level base station 43b, as shown in box 120.

Initiation does not have to come from first level base station 43a. It could be initiated elsewhere, such as in second level base station 43b or in one of ES-RFID objects 20.

Communication from ES-RFID objects 20 to base station 43a can be one at a time. It can also be all at once if base station 43a is equipped, for example, with multiple receivers.

Figure 5A:
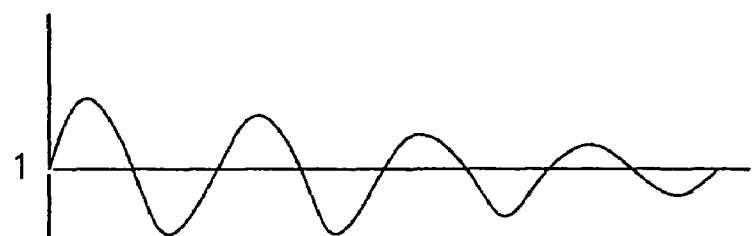
FIGS. 5a-5e provides illustrative data showing how accelerations of ES-RFID objects may differ and how those that are substantially related may be detected.
Figure 5B:
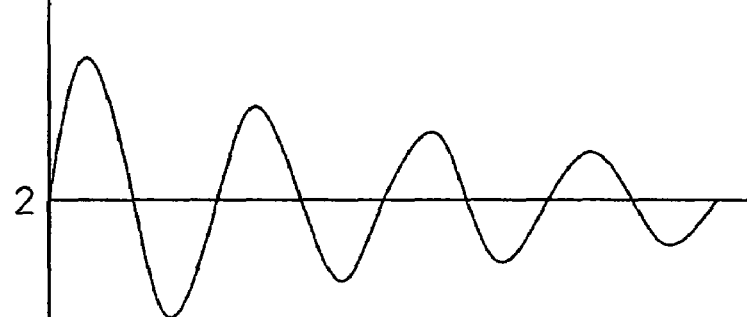
Figure 5C:
Figure 5D:
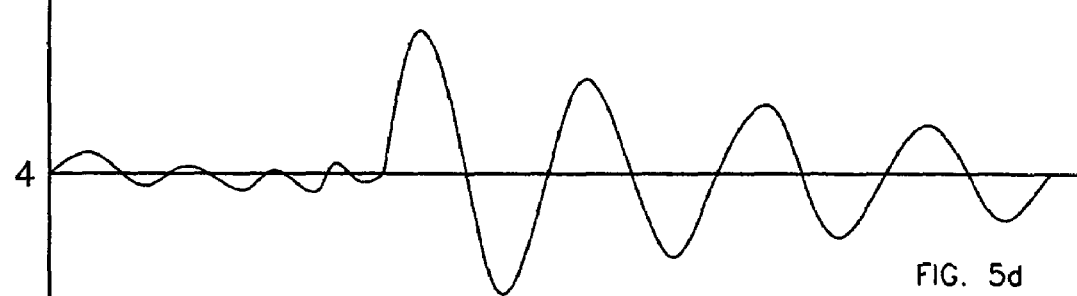
Figure 5E:
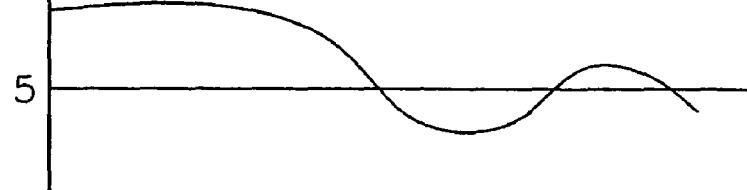

Comparisons to determine that data from a ES-RFID object is linked to data received by base station 43a is provided in FIG. 5a-5e showing illustrative data being compared. While amplitudes of the two data streams in FIGS. 5a and 5e are very close, the data can be distinguished because curve 5a has nine zero crossings while curve 5e has three zero crossings. Thus, the ES-RFID object producing curve 5e may be identified as not moving together with the ES-RFID object producing curve 5a.

Curves 5b, 5c and 5d also have nine zero crossings for amplitude above a threshold value. In addition, the times of the zero crossings of curve 5b match the time of the zero crossings of curve 5a. Also the time between zero crossings for these two curves match, all consistent with substantially related data and ES-RFID objects producing these curves moving together.

While curve 5c also has nine zero crossings the times of the zero crossings and the time between zero crossings for curve 5c is different from these times in curves 5a and 5b. Thus, the ES-RFID object producing curve 5c is identified as not moving together with the objects producing curves 5a and 5b.

In addition to showing nine zero crossings curve 5d shows the same time between zero crossings as curves 5a and 5b but curve 5d shows different actual times for the zero crossings. Thus the curve 5d shows substantially related data with curves 5a and 5b but indicating that the object is experiencing the same accelerations at an earlier time. Thus the ES-RFID object that produced curve 5d may be identified as moving together with the objects producing curves 5a and 5b but in a more forward location so it receives bumps earlier.

For determining zero crossings, each zero level may be defined as half way between minimum and maximum values. In some cases it can also be defined as the location of steepest slope. Zero level can also be determined when ES-RFID objects and base station are at rest.

Figure 6:
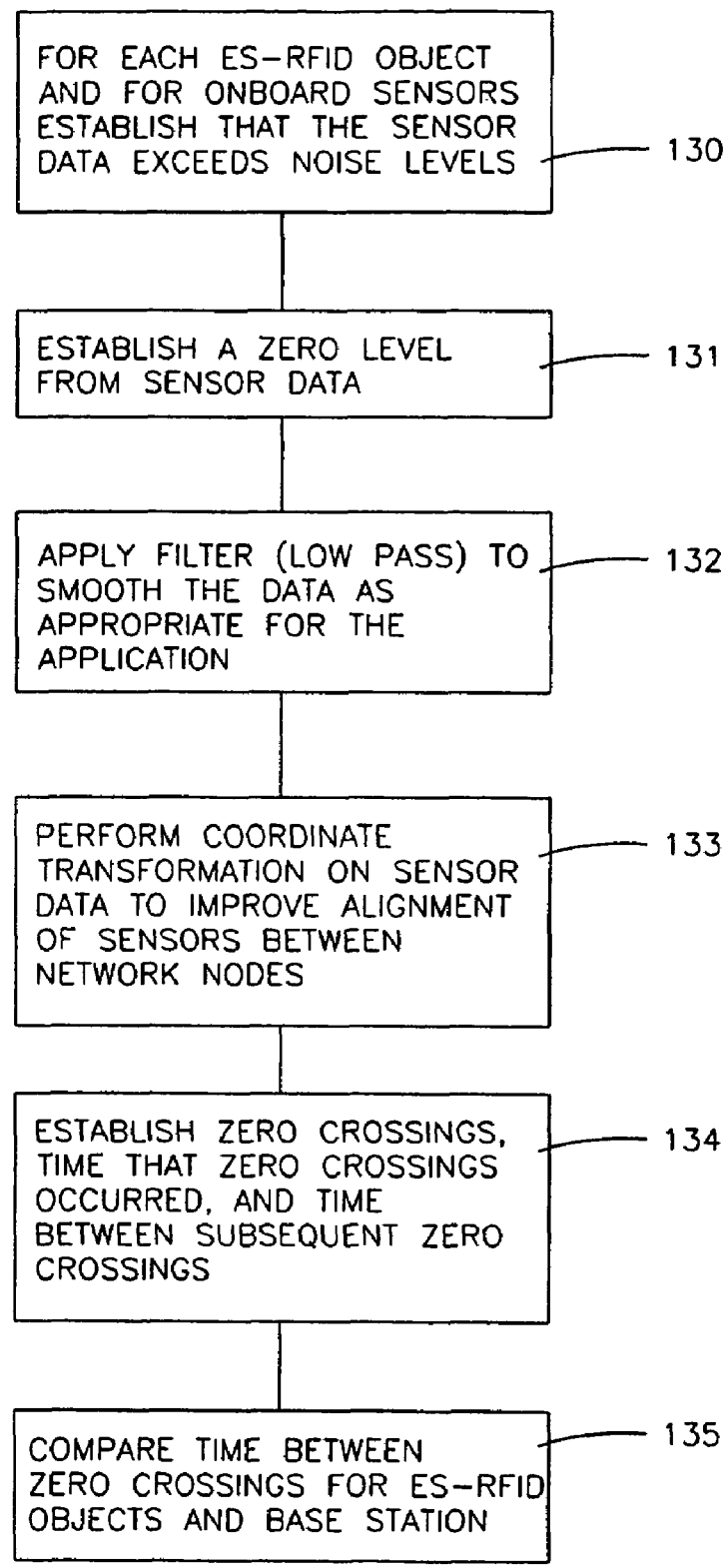
FIG. 6 is a flow chart of another embodiment showing how objects that are substantially related may be identified by zero crossings.

To avoid error it is important to establish that data exceeds a threshold level to eliminate mere noise causing zero crossings, as shown in FIG. 5d and in box 130 in the flow chart in FIG. 6. Next a zero level is established from the sensor data, as shown in box 131. A filter is applied to the data to smooth data as appropriate to the application, as shown in box 132. A coordinate transformation may be applied to improve alignment of sensors to adjust for different times related objects may experience accelerations, as shown in box 133. The times of subsequent zero crossings, times between zero crossings, and the number of zero crossings are measured, as shown in box 134. These times and numbers for each ES-RFID object are compared with times and numbers for base station 43a, as shown in box 135. If they are the same within a tolerance the particular ES-RFID object whose data is being compared is identified as physically linked to base station 43a.

Second level base station 43b need not have sensing capability. It may just collect and store data from first level base stations. It serves as a data repository and as a gateway for external communication via internet, cell phone, etc.

Sensors, such as triaxial accelerometers on different objects may be skewed with respect to each other because of varying amounts of tilt among the ES-RFID objects. The static response of accelerometers gives information about tilt with respect to the gravity vector. This static response data can be used to perform a coordinate transformation to ensure that the data from each ES-RFID object and base station 43a are aligned. This mathematical transformation is well known. The angles each accelerometer makes with earth's gravity vector are used to project the static and dynamic accelerations to the vertical and horizontal planes. The projected data can then be processed by base station 43a determine of ES-RFID object and base station 43a are linked. Thus, accelerometers in ES-RFID objects and in base station 43a need not be aligned with each other.

Base station 43a may be located on fork lift truck 40, as shown in FIG. 1. Base stations may also be located off of fork lift truck 40, for example, on a stationary table in the warehouse in which fork lift truck 40 operates.

Preferrably communications between base station 43a and ES-RFID objects or among ES-RFID objects use the IEEE 802.15.4 protocols which allow many members of a network to all communicate without interference. The IEEE 802.15.4 protocol provides for one node transmitting at a time while others wait, thus avoiding collisions from data provided from multiple sources.

If there are two or more levels of base stations, as shown in FIGS. 1 and 4, for example, a first level base station 43a located on each pallet 22a, 22b can collect data from objects moving with each pallet 22a. It can then transmit a signal indicating that it has data. Second level base station 43b polls all first level base stations 43a on pallets 22a, 22b. One at a time, the first level base stations 43a on each pallet can communicate summary data to second level base station 43b. Second level base station 43b receives each data set from first level base station 43a on each pallet 22a, 22b. This data set from each pallet 22a, 22b includes all the ID's of ES-RFID objects on that pallet plus the ID of the pallet itself. By limiting power of the RF transmission from each ES-RFID object, thus limiting range of transmission, each ES-RFID object will only communicate locally, for example to the first level base station 43a on the pallet on which it is located. First level base stations 43a on each of the pallets can have more power to communicate with the second level base station 43b. Since first level base stations 43a aggregate data from many ES-RFID objects they need not communicate as often. Thus, many objects may be monitored and grouped while avoiding data collisions.

In this embodiment a processor or circuit in base station 43a or a computer connected to base station 43a determines which of the ES-RFID objects have data indicating that they may be experiencing related accelerations and therefore are moving together as members of subgroup 20a-20c, as shown in box 104. Accelerations are provided to ES-RFID objects 20a-20c mounted on pallet 22a as they are lifted by fork lift truck 40 or as they bounce along as fork lift truck 40 drives them through the warehouse.

This subgroup of ES-RFID objects 20a-20c moving together may be on a common platform, such as pallet 22a being moved by fork lift truck 40, as shown in box 105. This subgroup may also be connected objects, such as a car and a trailer or railroad cars. Or it may be disconnected objects, such as a group of cars moving in proximity along the same highway, as shown in box 106.

Base station 43a also determines those ES-RFID objects 20d-20f whose acceleration data remains zero over a period of time, which is an indication that they are stationary, as shown in box 107. Base station 43a also determines those ES-RFID objects whose non-zero acceleration data is not substantially related to data from subgroup 20a-20c of box 104, indicating that these ES-RFID objects may be moving but they are not moving together with subgroup 20a-20c, as also shown in box 107.

As mentioned herein above, in this embodiment both ES-RFID objects 20a-20c mounted on moving pallet 22a and all other ES-RFID objects in the warehouse, such as ES-RFID objects 20d, 20e, 20f on stationary pallet 22b, transmit their information to base station 43a. In this embodiment base station 43a has the task of identifying members of subgroup 20a-20c of ES-RFID objects 20 that are located on pallet 22a, and distinguishing from all other ES-RFID objects, such as ES-RFID objects 20d, 20e, 20f on stationary pallet 22b by comparing data transmitted by each ES-RFID object.

Figure 7:
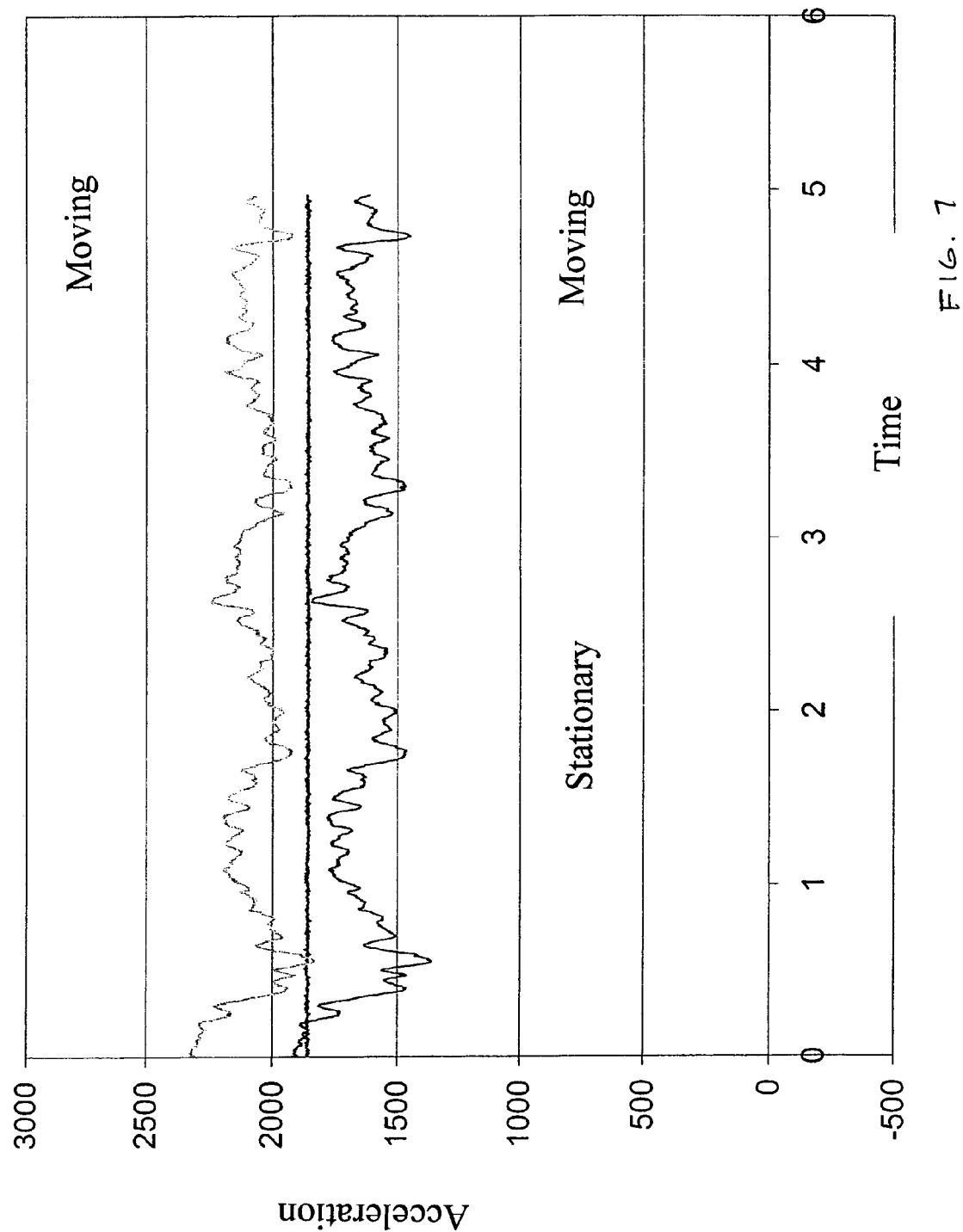
FIG. 7 provides data from an experiment showing related accelerations of ES-RFID objects tied together that are subject to movement in comparison with a stationary ES-RFID object.

In one embodiment, base station 43b broadcasts commands to all ES-RFID objects and local base stations 43a, including a command to begin logging data. In response, all ES-RFID objects log data, such as acceleration data. The present inventors found that reasonable synchronization was obtained from the receipt of the broadcast command by the ES-RFID objects. In an experiment the present inventors broadcast a command to G-link devices (Microstrain, Inc., Williston, Vt.) to start sampling. G-link devices include data logging, accelerometer sensors, and two-way radio communications. The data from the G-link devices showed that they are well synchronized with each other, as shown by the acceleration traces in FIG. 7.

For the comparison of data shown in s 113 and 114 in FIG. 4, a microprocessor in first level base station 43a runs an algorithm to compare data and determine which are substantially related. One approach to comparing data from different ES-RFID objects to detect substantially related data is to compare zero crossings as described herein above. In this embodiment, the base station sends a signal to record data, including acceleration and time. A zero crossing occurs at each time the acceleration equals zero. The microprocessor in the base station may compare the zero crossing times, the time between zero crossings, the frequency of zero crossings, or the number of zero crossings in a time interval. Time between zero crossings may be checked to account for different delays, as described herein above. The microprocessor could also do a fast Fourier transform of the acceleration v. time data to provide amplitude vs. frequency data. From the fast Fourier transform, one can determine at which frequency most of the energy is, creating a spectral signature of these data. One can see if the signature, or characteristics of the signature, such as peak frequencies, match up, and use these data to create groups of ES-RFID objects. Alternatively the microprocessor can look at the time for peaks in acceleration and see if timing of peak accelerations match. Alternatively the algorithm may measure the average time between zero crossings for all ES-RFID objects. It can then compare the measured average times for all ES-RFID objects and determine if the average time between zero crossings identical within a specified tolerance for two or more ES-RFID objects. If yes, it can identify those objects as substantially related.

The substantially related data recognized by base station 43a that enables it to distinguish ES-RFID objects 20a-20c may be the result of ES-RFID objects 20a-20c being exposed to the same accelerations over a period of time as they are all lifted, travel over bumps, and are later put down together on the same fork lift truck 40. With data from a longer time period showing consistently common acceleration data, the confidence that objects are actually moving together or are moving on a common platform increases. While data from ES-RFID objects located on different parts of a pallet or vehicle may exhibit differences in phase and amplitude from each other, frequency characteristics, changes in amplitude, and timing features of the acceleration data will show whether or not that the data is substantially related. Algorithm output can include members of subgroup, order of members, nearest neighbors, and other parameters, such as speed, and change in speed.

Sensor 24a on each ES-RFID object 20a-20c may be an array of one, two, or three accelerometers to provide accelerations along orthogonal coordinates. Of course, other sensors can be used, such as magnetometers, strain sensors, or position sensors. Substantially related changes in parameters such as orientation or position will just as well define members of a subgroup traveling together as substantially related changes in acceleration.

If another set of ES-RFID objects were independently moving together separately from the two moving objects shown in FIGS. 5a, 5b, their data, such as curve 5c would indicate accelerations over time but there would be no substantial relationship between the two families of curves. Thus, separate subgroups could be identified from the data.

Each ES-RFID object may be independent of wired sources of energy, relying on battery power or on energy harvesting for its energy. For such energy independence energy conservation is desirable. Substantial energy savings would be available from several improvements in the embodiment described herein above. Recognizing that transmission requires much more power than on-board data processing, to conserve energy, the present inventors provided that each ES-RFID object 20 need not transmit all its sensor data at all times. For example, each microprocessor may be programmed to transmit data from a particular narrow time frame and to remain in sleep mode between selected time frames, thus saving substantial energy. Crystal 45 and sleep timer 46 can be used for this purpose.

To further conserve energy, only summary data, such as an average value data point from the time frame may be transmitted during small intervals when processor 30 is awake and transmitter 32 is on. Values or summary data from the same time frame from the various ES-RFID objects are compared in base station 43a to determine ES-RFID objects having related or matching data. Thus, a value derived from acceleration data collected over a period of time, such as an average value or the maximum value over that period of time may be transmitted. In this case, periodic transmission from each ES-RFID object is reduced to a single data point and an ID code. Alternatively, another summary data parameter, such as time between bumps detected with an accelerometer can be transmitted. Because they are all moving on the same pallet 22a, each ES-RFID object 20a-20c should experience an average value or a maximum value over the same time frame and a time between bumps that is close to that of all other ES-RFID objects 20a-20c on pallet 22a.

These techniques can be used in combination with other schemes to reduce the data before transmission. For example, processor 30 in each ES-RFID object 20a-20c may be programmed to direct transmission of data only when a value of the sensor data exceeds a previously set threshold. In this scheme, only ES-RFID objects that are being moved, for example, and have an acceleration that exceeds a threshold, will transmit that data, or a reduced version of that data, along with their ID codes. Other ES-RFID objects that remain stationary will not experience accelerations above the threshold, will not transmit, and their processors and other electronic circuitry can remain in sleep mode or turned off. If only a small fraction of ES-RFID objects are being moved at any time so they are being accelerated above the threshold, this scheme results in only a small fraction of the ES-RFID objects transmitting at any time, and the overall energy used for transmission is greatly reduced. In addition, the burden on base station 43a to receive data from many wireless sensing devices is reduced. Also the burden on processor 44 in base station 43a to distinguish those ES-RFID objects moving on the same pallet 22a from other ES-RFID objects is greatly reduced since only data from those that are accelerating above the threshold need be compared.

Figure 8:
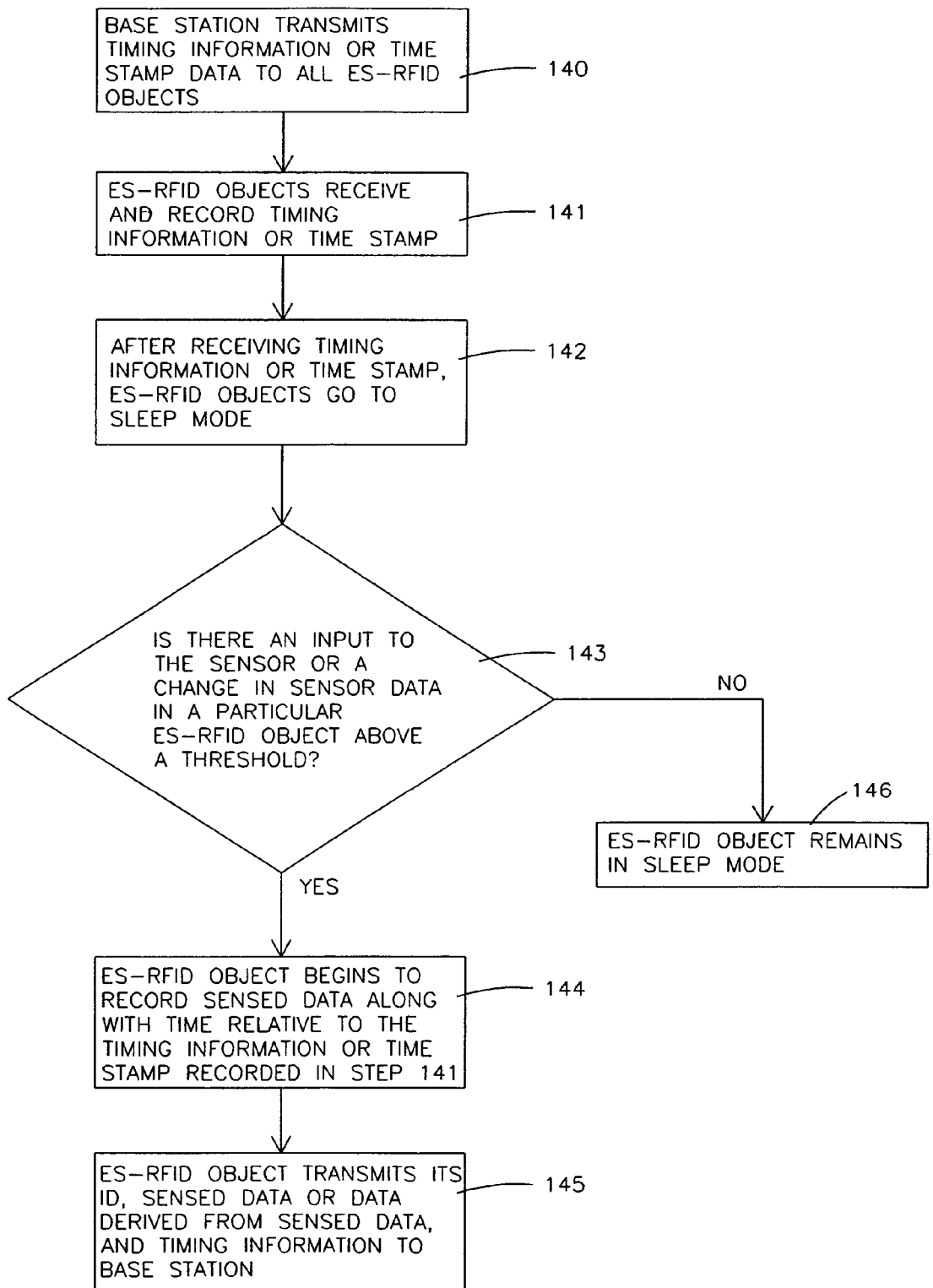
FIG. 8 is a flow chart of another embodiment showing ES-RFID objects responding to a change in sensor data above a threshold.

In another embodiment, base station 43a transmits timing information or time stamp data to all ES-RFID objects 20 as shown in box 140 in FIG. 8. ES-RFID objects 20 receive and record this timing information or time stamp data, as shown in box 141. Thus, all ES-RFID objects 20 have the same initial time and can synchronize their clocks. After receiving the timing information or time stamp, ES-RFID objects 20 go to sleep mode, as shown in box 142, saving a significant amount of energy. Microprocessor 30 in each ES-RFID object 20 is programmed to wake up if its sensor 24 senses an input or a change in sensor data, as shown in box 143. The sensor event that interrupts sleep and wakes up microprocessor 30 is generated by a voltage level from sensor 24 to one of the microprocessor digital inputs (not shown). That voltage level to interrupt sleep mode is typically above 0.7 volts. For example, a piezoelectric sensor can itself generate, without any power, tens to hundreds of volts when impacted, which is more than needed. Another example of a self-generating sensor is a geophone which can also be used. The input to sensor 24 can typically be a mechanical input, such as an impact or a vibration, and the change in sensor data results in a voltage output from sensor 24 to microprocessor 30 that wakes up microprocessor 30. The thresholds required to trigger wake up could be programmed so that normal operation of the machine is sufficient to trigger wake up. One sensor can provide output to two inputs on microprocessor 30, the digital input and A/D converter input 53. Alternatively, one sensor can be used to provide the wake up and another sensor can be used to provide acceleration or vibration information. In this embodiment, microprocessor 30 may be programmed to wake up only if the sensor data exceeds a preprogrammed threshold.

Microprocessor 30 can also be programmed to wake up periodically, power up sensors, and read the sensors and decide if sensor data exceeds a programmable threshold. Otherwise microprocessor 30 goes back to sleep mode.

Microprocessor 30 can also be programmed to wake up periodically and check for commands broadcast to its radio receiver 32. If microprocessor 30 detects a broadcast command from a base station or from another ES-RFID object on the network it can be programmed to remain awake.

After waking up ES-RFID object 20 then begins to record sensed data in non-volatile memory 26 along with time relative to the timing information or time stamp, as shown in box 144. ES-RFID object 20 then transmits its ID, sensed data or data derived from sensed data, and timing information to base station 43a, as shown in box 145. The data derived from sensed data may be reduced data, such as average, time between zero crossings, frequency of zero crossings, timing of peaks, time between peaks, etc. If sensor 24 does not sense an input or a change in sensor data then microprocessor 30 remains in sleep mode, transmitter 32 remains off, and most other power supplies are turned off, as shown in box 146.

In one embodiment the processors in base station 43a and in each ES-RFID object are programmed to awaken themselves at regular time intervals, such as every second, and when they awaken the processors check to see whether any commands are being transmitted that it needs to respond to or if the sensors are indicating a change in the object's state or condition. The wake up interval is programmable. All can be awakened and then a command to start logging can be given.

Figure 9:
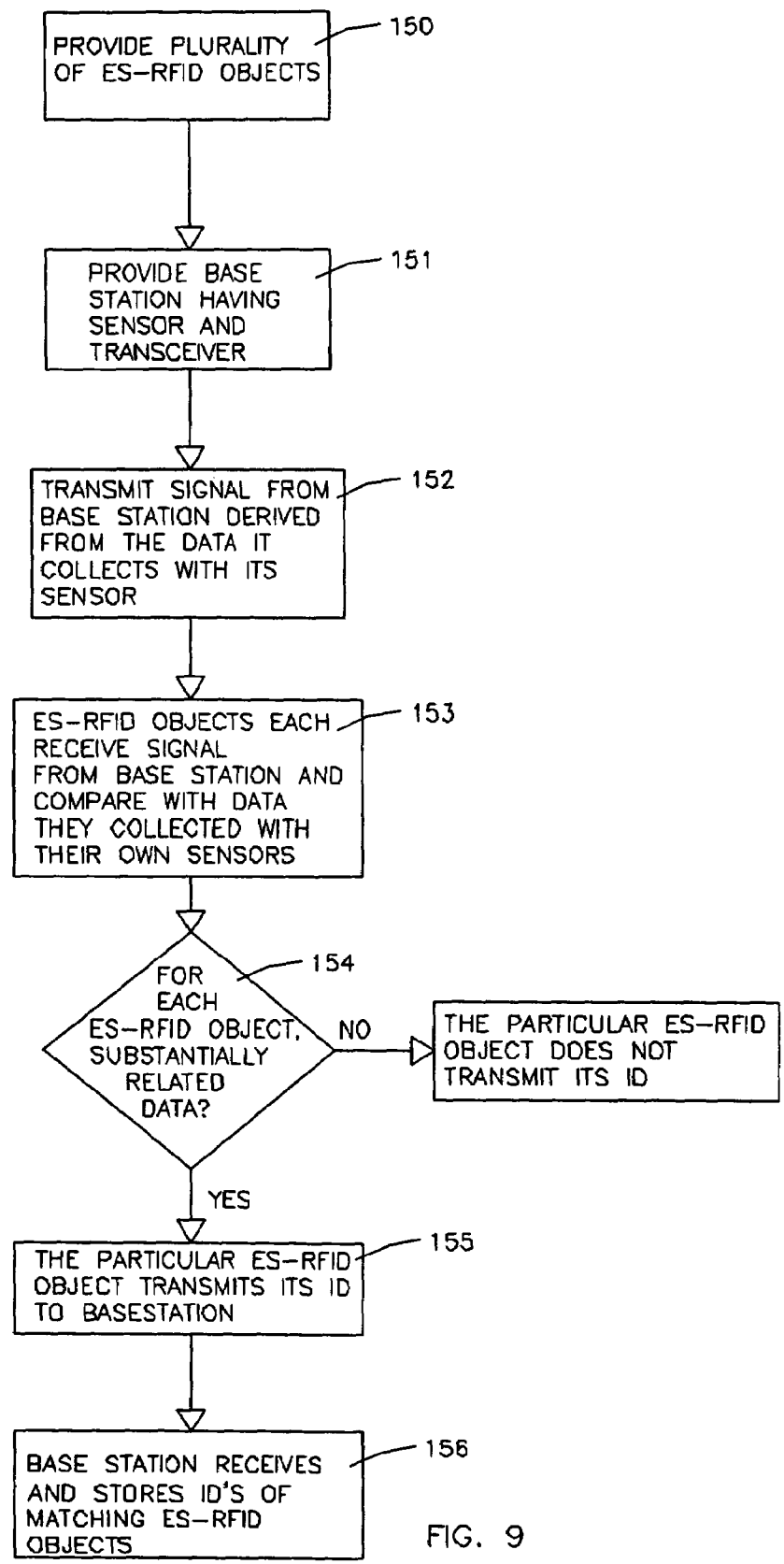
FIG. 9 is a flow chart of another embodiment in which a base station with a sensor transmits its sensor data to a network of ES-RFID objects which compare their sensor data with the base station's data to determine if they are substantially related to the base station, and if so they transmit their ID codes to the base station.

Another embodiment greatly simplifies processing of data and further reduces energy consumption by ES-RFID objects 20. ES-RFID objects 20a-20i and base station 43a are provided, as shown in s 150 and 151 of the flow chart in FIG. 9. Base station 43a includes a sensor or a group of sensors. Base station 43a is located where it can receive an input to its own sensor or sensors at the same time sensors located on ES-RFID objects 20a-20c receive the input to their sensors. For example, accelerometers on base station 43a located on a platform moving with the forks of fork lift truck 40 receives the same or a related acceleration input as ES-RFID objects 20a-20c when these forks pick up pallet 22a or when fork lift truck 40 travels around in the warehouse with them, as shown in FIG. 1.

In this embodiment, base station 43a transmits a signal derived from data its own sensors collect, as shown in box 152 of the flow chart in FIG. 6.

ES-RFID objects 20a-20i include transceivers, and they can all receive the signal transmitted by base station 43a with the data derived from the base station's own sensors. Thus, ES-RFID objects 20a-20i receive data derived from one or more sensors on base station 43a, as shown in box 153. ES-RFID objects 20a-20i also have circuits to compare data provided in that received signal from base station 43a with data collected by their own sensors 24, as also shown in box 153.

Results of the comparison performed by each ES-RFID object determines if there is substantially related data, as shown in box 154.

Those ES-RFID objects 20a-20c that determine that data they collect from base station 43a is substantially related to data collected by own sensors 24 transmit their ID codes back to base station 43a, as shown in box 155. Alternatively they may transmit their ID codes to another base station (not shown).

Base station 43a receives and stores ID codes of the subgroup of ES-RFID objects 20a-20c that transmitted their ID codes, as shown in box 156, thus determining subgroup 20a-20c of ES-RFID objects 20 that sensed the same condition that base station 43a sensed. That condition can be, for example, an acceleration or a series of accelerations, changes in orientation, or changes in position.

Figure 10:
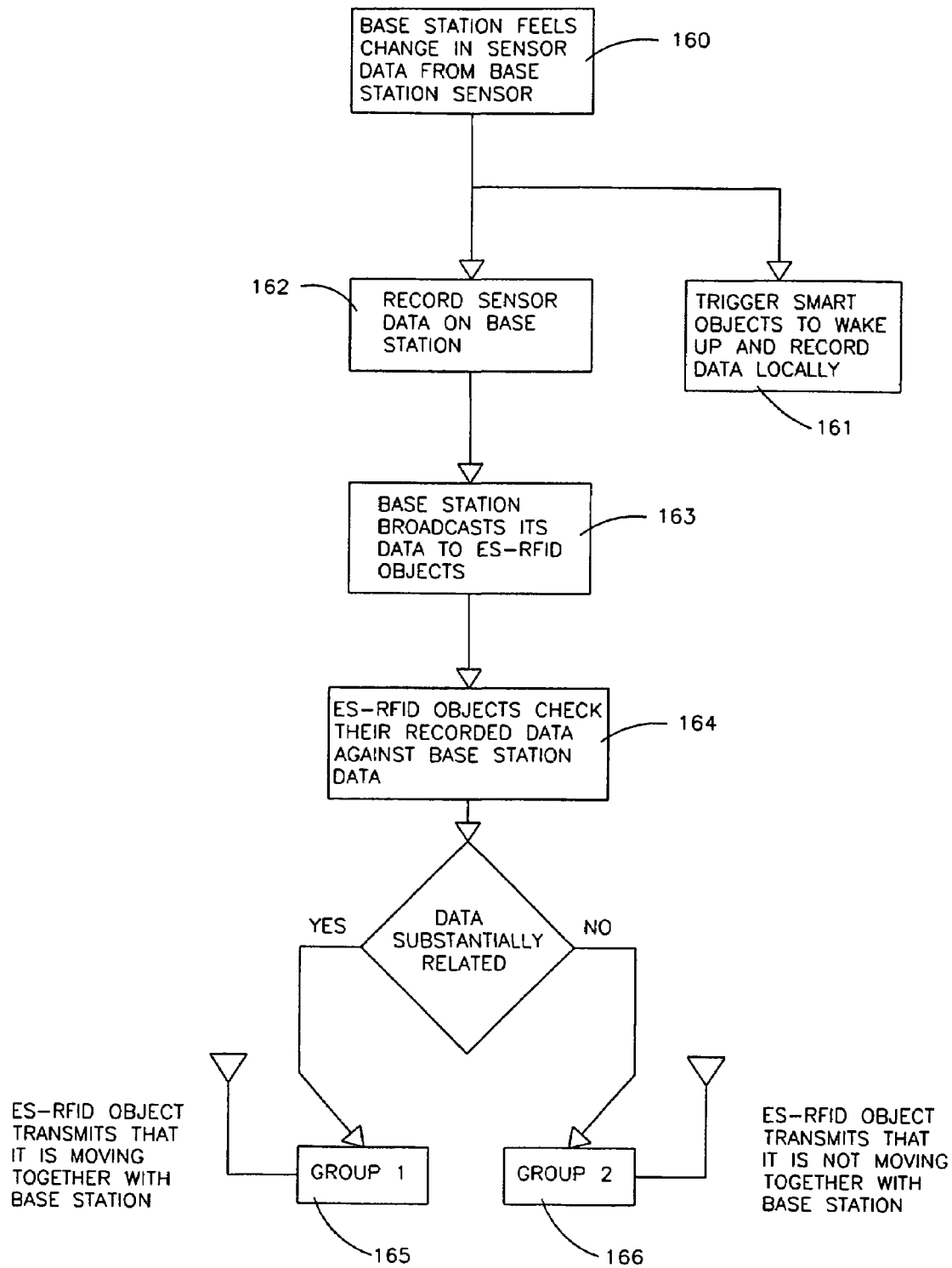
FIG. 10 is a flow chart and block diagram of another embodiment in which a base station with a sensor transmits its sensor data to a network of ES-RFID objects which which compare their sensor data with the base station's data to determine if they are substantially related to the base station, and if so they transmit information indicating whether it is moving with the base station or not.

In a further enhancement of this embodiment, to further conserve energy, ES-RFID objects can be maintained in sleep mode until base station 43a transmits a signal to ES-RFID objects 20 to wake up. Base station 43a is mounted where its sensors experience an input, such as a change in acceleration, as shown in box 160 in the flow chart of FIG. 10. Base station 43a can be mounted, for example, on a fork lift truck or other vehicle, so that a sensor in base station 43a detects a change in a condition for base station 43*a*. Based on the change in its sensor data, base station does two things, first transmitting a signal to ES-RFID objects to wake up and start recording their own sensor data, as shown in box 161. Second base station 43*a* initiates recording of sensor data in base station 43*a*, as shown in box 162. After an interval of time of recording sensor data, base station transmits its data, and ES-RFID objects 20 receive the data transmitted from base station 43*a*, as shown in box 163. All the ES-RFID objects compare their recorded data with the data transmitted to them from base station 43*a* to determine whether the data substantially relates, as shown in box 164. Those ES-RFID objects that determine that there is substantial relation transmit their ID codes to base station 43*a*. The list of ID codes identifies those ES-RFID sensors 20*a*-20*c* whose data indicates that they share a condition with base station 43*a*, as shown in box 165. Alternatively or in addition, those ES-RFID objects that determine that there is no substantial relation can transmit their ID codes to the base station with a signal indicating that they are not part of a subgroup receiving data that is substantially related to data recorded by base station 43*a*, as shown in box 166.

Figure 11:
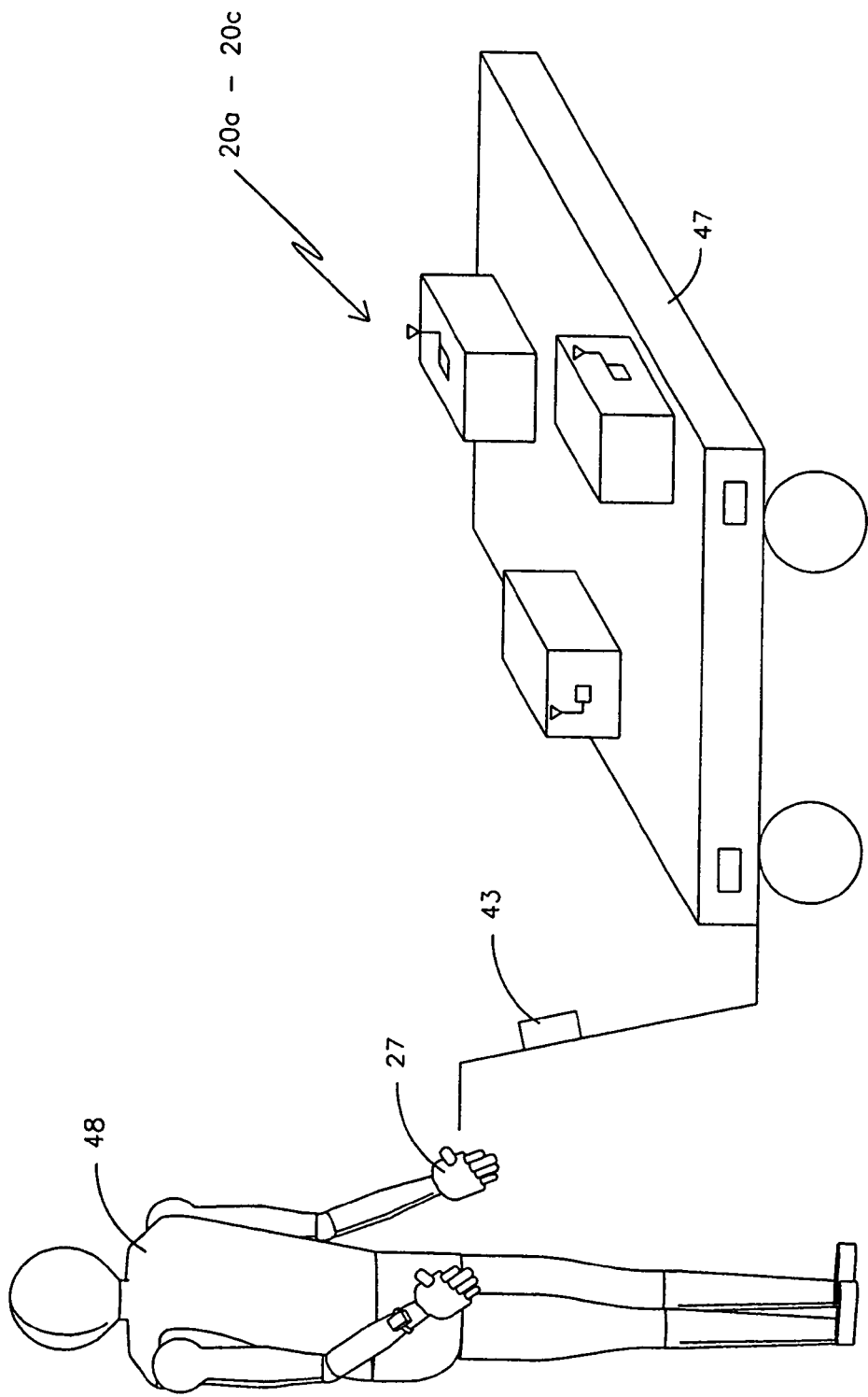
FIG. 11 is a three dimensional view of another embodiment in which a customer with an ES-RFID tag moves with a cart that has a base station and is used for carrying ES-RFID objects.

In another enhancement, base station 43*a* of the present application can be provided to a cart, such as a grocery cart 47, as shown in FIG. 11. Electronic system 27 can be provided to customer 48 who is moving with cart 47, and who may be adding ES-RFID objects 20*a*-20*c* to it as he/she shops. Thus his/her purchases are identified with base station 43*a* either on cart 47. The purchases can alternatively be identified with customer 48. Or they may be identified with both cart and customer, as customer 48 pushes cart 47 and generally moves with cart 47. Customer 48 may have electronic system 27 on a bracelet or necklace or on a card he/she carries in his/her wallet or pocketbook. Electronic system 27 may be provided to customer 48 as he/she enters the store, and identification information about his/her may be added to its memory at that time. In this embodiment, for example, a book store or self-service furniture store may have tags with electronic system 27 attached to all the books or items of furniture in the store. Books or furniture selected by a customer will all be moving together in a group on cart 47 (or in his/her hands if he/she uses no cart). Each ES-RFID object 20*n* is identified with the subgroup, with each other, with cart 47, and/or with customer 48, as described herein. One advantage of this system is that if the customer changes his/her mind and returns a ES-RFID object to a shelf that ES-RFID object stops moving with cart 47 and base station 43*a* can automatically detect that it is no longer part of the subgroup, so customer 48 would not be charged for that object.

Alternatively, customer 48 can provide identifying information to a reader on base station 43*a* on the cart, and then information about customer 48 and ES-RFID objects 20 that he/she selects, and that all move with cart 47, are stored in memory in base station 43*a* on cart 47.

In either case, checkout is greatly simplified since the system knows who customer 48 is and what products he/she has selected. Customer 48 need not wait in a checkout line and may immediately receive a receipt and pay for his/her merchandise. If his/her credit card number is on file he/she can sign the receipt, and walk out of the store with his/her merchandise without delay. In some types of stores customer 48 can fill up shopping bags directly in the cart, eliminating the separate bagging step as well.

Figure 12:
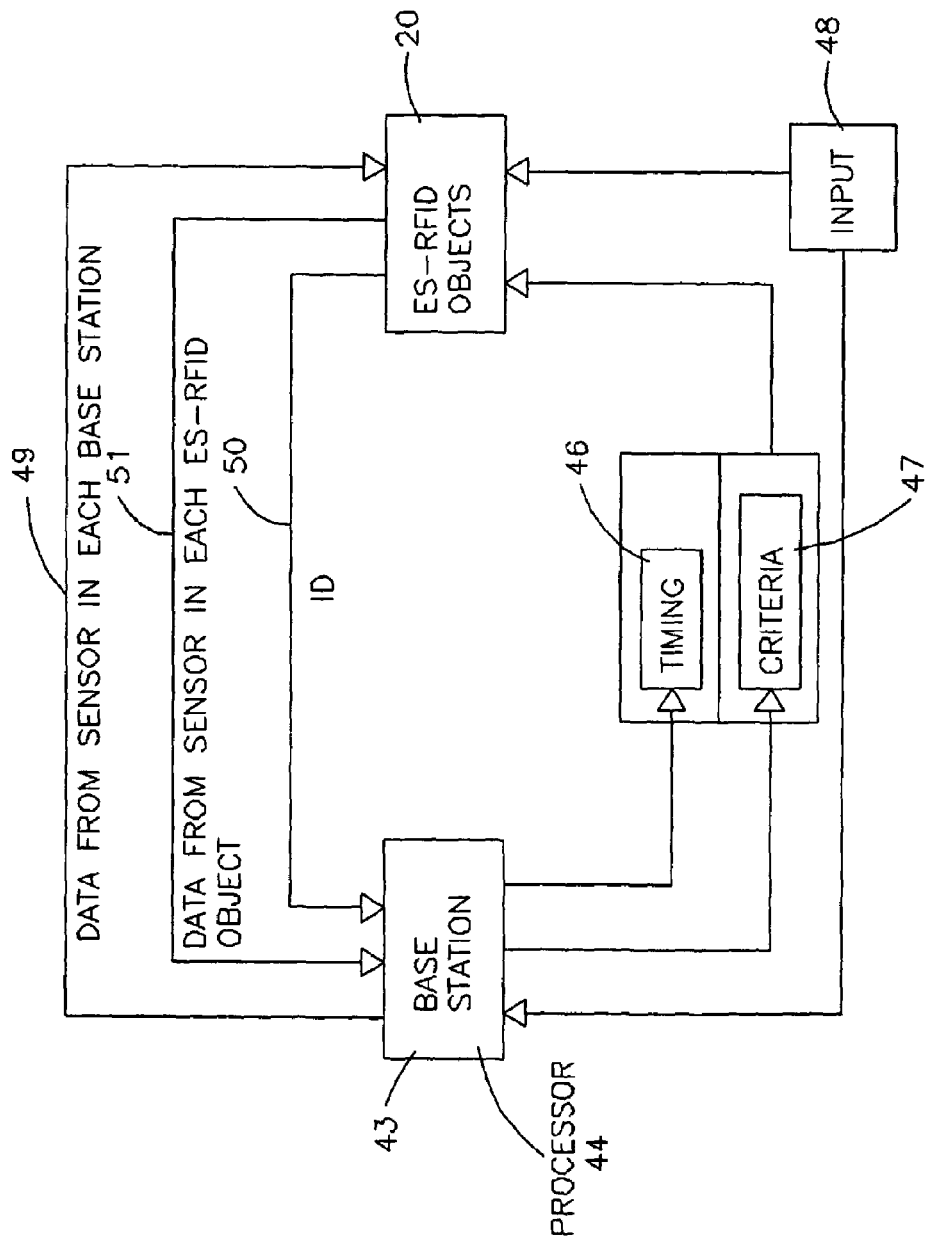
FIG. 12 is a high level system diagram showing how components communicate with each other.

FIG. 12 provides an operational diagram of the parameters that can be adjusted in schemes for identifying subgroups of ES-RFID objects. Base station 43*a* can transmit timing information 46 and criteria 47 to ES-RFID objects 20. Timing information 46 can synchronize ES-RFID objects 20 to the same clock to facilitate determining whether information they gather shows a substantial relationship among a subgroup of ES-RFID objects. Criteria 47 may include a threshold magnitude of sensor data needed to initiate logging and/or transmission of that data. It can also include a given change in sensor data. It can also include a signal input by an operator. Base station 43*a* may include its own sensor and can be located where it can receive input 48 along with some of the ES-RFID objects 20. Base station 43*a* can then transmit sensor data 49 resulting from input 48 to sensors in base station 43*a*. ES-RFID objects 20 can receive that transmission and perform the comparison of sensor data.

Base station 43*a* receives identification information 50 transmitted from ES-RFID objects 20. In addition, in one embodiment, base station 43*a* may receive sensor data 51 transmitted from ES-RFID objects 20. If ES-RFID objects 20 are set to transmit their sensor data 51 to base station 43*a* the comparison step is performed within base station 43*a*. In this case the comparison step performed within base station 43*a* can be between data sensed by a sensor within base station 43*a* and data 51 transmitted from each ES-RFID object 20. The comparison step can also be a comparison of data 51 from one ES-RFID object 20 with data 51 from another ES-RFID object 20, and this comparison is accomplished within base station 43*a*.

Input 48, for example, an acceleration, may be provided to ES-RFID objects 20 or to a subgroup of ES-RFID objects 20. Input 48 may also be provided to base station 43*a*. If input 48 is provided to base station 43*a* then base station 43*a* can transmit sensor data it collects, or summary data derived from data it collects, to all the ES-RFID objects 20. Those that have substantially related data can transmit their ID codes back to the base station 43*a* identifying a subgroup. Alternatively base station 43*a* can be used for the comparison calculations, and in this case, it receives sensor data transmitted from ES-RFID objects 20.

In addition to microprocessor 30, non-volatile memory 26, and analog circuitry for analog sensor signal conditioning 28, printed circuit board 31 in ES-RFID object 20*a*-20*c* also includes data conversion elements, such as A/D converter 53, sensor power supply 54, and sensor signal conditioning power supply 56, as shown in FIG. 2.

Printed circuit board 31 also includes radio power supply 58 and RF transmitter or transceiver 32, both connected to microprocessor 30, as shown in FIG. 2. RF transmitter or transceiver 32 transmits data it receives from microprocessor 30 through antenna 34. Base station 43*a* receives transmissions from RF transmitter or transceiver 32 through its base station antenna 60 and can display data on display 62 or transmit data to other receivers through the internet represented by cloud 64, as also shown in FIG. 2.

Printed circuit board 31 can also include additional electronic components 70 used to facilitate harvesting energy from available ambient sources of power (not shown), and their output may go to battery charging circuit 72 and energy storage device 74 to recharge energy storage device 74, which may be a rechargeable battery or capacitor, as described in copending US patent applications Ser. Nos. 10/379,223 and 10/769,642.

Energy storage device 74 may be a very low leakage, high capacity capacitor, or "super capacitor," such as those provided by the Panasonic's Gold Gap series, Matshushita, Corp. Japan. Alternatively, rechargeable electrochemical batteries capable of a very high number of recharging cycles (Infinite Power Solutions, Golden, Co) may be deployed. Energy storage device 74 may be a single or multi-celled lithium-ion battery or an electrochemical battery. Lithium-ion charge controller, such as the BQ2400X available from Texas Instruments, properly charges a lithium-ion battery and protects the battery from such improper input as overcharging, and overheating. Rechargeable batteries provide a reliable long term storage device.

Battery charging circuit 72 can optionally include a nano-amp voltage comparator switching circuit, similar to that described in FIG. 11*b* of US patent application 115-008, which provided a piezoelectric energy harvesting system. A nano-amp voltage comparator monitors output voltage to ensure that adequate charge is available to store on charge storage device 74. If the nano-amp comparator determines that a high enough voltage is being generated then it switches that voltage into energy storage device 74.

The charge level provided on energy storage device 74 provides an unregulated output level which is then regulated to a voltage level Vcc in regulator 76, as shown in FIG. 2. This regulated Vcc is provided to the various power supplies on PC board 50, including a power supply for microprocessor 30 and power supplies 54, 56, 58 for sensors, signal conditioning, and RF transmission. Regulator 76 may include an LP series regulator from National Semiconductor Corporation, Santa Clara Calif., part number LP2980IM5-3.0.

Battery charging circuit 72 insures that the battery can be trickle charged when low energy is being harvested or charged more rapidly in the event that higher levels of energy are available. As there are many types of batteries available, an appropriate commercially available charge controller specific to the battery chosen is desirable to control the charge process.

For an energy harvesting device generating a large amount of electrical energy a small energy storage device 74, such as a capacitor or a small rechargeable battery, is adequate because it can be kept fully charged even with all devices continually powered by processor 30. However, for an energy harvesting device that is generating energy slowly or intermittently, or is otherwise generating little electrical energy, preferably a larger battery or a larger capacitor is used to store energy and intermittently run power consuming electronics, such as microprocessor 30 and the sensing, data logging, and transmission elements shown in FIG. 2.

Sensors 24*a*-24*d* connected to inputs 24*a*'-24*d*' may be directly mounted on PC board 50 or they may be mounted off of PC board 50 and connected to PC board 50 with wires.

Embodiments of the present patent application can be used to identify wireless sensing devices whose data demonstrates that they are substantially related and therefore members of a subgroup. For example, they may all be moving together. They may be located on the same platform or vehicle so they all sense the same accelerations. Alternatively, they may all start moving from about the same location at about the same time but be moving in different directions. For example, they may all be moving out from a central point, as in an explosion. Or they may be moving in a circular path, as on a centrifuge or on a wheel, or another path where there is substantial relationship among some of the members. For example, tires can be linked to wheels to which they are mounted.

In another embodiment, several antennas are used to obtain location information, as described in strain energy harvesting patent application 115-008. With several antennas located on a truck, measured accelerations allow determining not only that a ES-RFID object is on a truck but also determining where it is located on the truck. Such relative position information can be determined from relative signal strength. Techniques for estimating position based on RF signal intensity have been described in U.S. Pat. Nos. 6,204,813 and 6,784,826, both incorporated herein by reference.

Radio frequency communication can be provided between ES-RFID objects and the base station over a variety of interfaces, including narrowband RF using a variety of modulation methods, such as FSK, ASK, and on-off keying (OOK). Alternatively, wideband RF methods can be used, such as direct sequence spread spectrum (DSSS) or frequency hopping spread spectrum (FHSS). Preferably the RF communication method would use a standard such as IEEE 802.11b (bluetooth or wireless ethernet) or 802.15.4 (ZigBee) protocols. These standards may include the option for embedding encryption to enhance the security of the radio link. The ZigBee standard also includes firmware which supports the advanced encryption standard (AES) as developed by the National Institute for Standards and Technology (NIST) as well as facilitating multi-hop communication between ES-RFID objects and base stations, as described in a chapter by Chris Townsend and Steven Arms, "Wireless Sensor Networks," Chapter 22 in Sensor Technology Handbook, edited by Jon S. Wilson, Elsevier, Burlington, Mass., 2005, incorporated herein by reference.

In another embodiment, as described in US Patent Application 20030105403 ("the '403 application"), incorporated herein by reference, it may be desirable to pair objects to establish communication exclusively between them. The method described in the present application of determining objects that are moving together provides an improved way to provide that pairing without passing the physical token key of the '403 application. Once grouping of ES-RFID objects has been established, further information can be sent over the radio link, depending on the programming of the base stations and the ES-RFID objects. Alternatively, further information may be limited between grouped objects. No ES-RFID object is required to send further information; further communication may require an encryption standard to be used or other programmed requirement to be met.

In another embodiment access to private key information can be blocked unless ES-RFID objects are substantially related.

In another embodiment base station access to information in substantially related ES-RFID objects may be blocked by including a requirement for a specialized encryption key. Alternatively the data may provide an "I am with you" key function. Once grouping has been established the ES-RFID object can still deny access to its information unless this encryption code is provided by the base station. The substantially related movement of objects, for example, allows additional ES-RFID objects to be added to the list of substantially related objects. Public keys could be used to allow access among ES-RFID objects to information that is conES-RFIDered public. Private keys can be used to protect information from public access and provide a higher level of security. In some circumstances a private key can be exchanged among the objects in proximity or contact that are moving together.

In another embodiment a determination can be made as to which of several different attachments to earth moving machine are attached to the machine by determining which attachments are moving with the machine. For example, a front loader may have the ability to work with any of several attachments. With multiple attachments nearby the present scheme allows for determination of which are presently attached and are moving with the front loader and which are nearby but are not attached. Objects 20*a*-20*c*, shown in FIG. 1, can be such attachments or parts of a larger machine, such as fork lift truck 40. All attachments within radio range can transmit to a base station located on front loader. However, only the one attachment actually connected to the front loader will provide substantially related acceleration data to that sensed by a sensor in the base station on the front loader.

By avoiding the need to input which tool is attached, improved condition based maintenance can be provided and a warning can be provided if a tool is being used the wrong way. By measuring loads and calculating fatigue based on those measurements, a controller can indicate when maintenance is needed. By automatically determining which part or subassembly is connected the system can automatically check and verify that the complete assembly includes the correct parts and that it is being used within specified limits. The present patent application meets the need for an automatic system to tell that a machine is being used in a different way. For example, wireless strain sensors attached to equipment could provide measurements of strains but if in addition the attachments to the machine are also determined these measurements can then be used to determine whether the machine is operating within or outside its specified limits. Furthermore, the strain sensors can provide a better estimate of wear and/or fatigue of the machine or structure if the attachments are known to more accurately predict when maintenance will be needed. By contrast, wireless signal strength would not necessarily determine which is connected and which is near.

In another embodiment, wireless controls on a trailer can be used to tell which trailer is connected to a particular car or truck. Multiple trailers can be nearby on the road at the same time all transmitting RFID signals. One may not be able to tell which trailer is connected to one's own car or truck and which are merely nearby. By using sensors on both car and trailer one can easily tell which of the trailers is attached to the car or truck by detecting which has substantially related sensor data, as described herein above.

Similarly, one can determine which parts are connected to which device. For example, one can have a machine that has hundreds of interchangeable parts and can automatically tell which are connected to the machine and which are merely nearby by monitoring sensor signals on both the machine and on the parts and determining which parts have substantially related sensor data to a sensor in a base station on the machine. The sensor may be one that detects vibration, angular velocity, strain, temperature, acceleration, or magnetic field.

In another embodiment for transportation, such as trucking, it is advantageous to have Global Positioning System (GPS) input to the base station so can also get the physical location of the set of assets moving together. With a ES-RFID enabled GPS system one gets more detailed information about the group of objects at a particular location. GPS tells where the machine is but not what is attached to that machine. With ES-RFID enabled GPS one can tell both where the machine is and what is attached to that machine.

Some electronic equipment, including laptop computers, currently include accelerometers and RF communications. The accelerometers are installed to provide acceleration information for use to protect the computer's hard drive. The method of the present application can be used to group such a ES-RFID object computer with other ES-RFID objects to facilitate production, test, or inventory, for example, as pallets of the at least partly finished computers move around a warehouse.

In another embodiment, each subassembly to be added to a larger machine, such as an automobile, can each have be a ES-RFID object. The ID code of the subassembly can be used as a gateway to further information about the subassembly that may be located on a server attached to the internet, for example. This would provide the ability to trace a subassembly, and assists the manufacturer and end user in designing or later finding and recalling or repairing products that may have defects.

Alternatively, some or all of the information about the subassembly can be stored in memory on the subassembly itself, including its history of use, wear, association with another assembly or with a vehicle or structure, a change to another vehicle or structure, accident history, maintenance history, time in service, and information such as flight hours and number of landings. A paper, "Component Tagging and Tracking—an Essential Enabling Technology for Effective 'Safe Life' Structural Life Monitoring," By M. El-Bakry, published in Structural Health Monitoring 2005, Proceedings of the $5^{th}$ International Workshop on Structural Health Monitoring, Stanford University, Stanford, Calif., Sep. 12-14, 2005, incorporated herein by reference, describes a wand system for obtaining such data from subassemblies having RFID tags. The present patent application allows such data to be stored locally on the part as well as allowing uploading the information to a base station or to a server. It allows for automatic association of the part with the vehicle or structure it is mounted on and its association with other parts of that vehicle or structure. For example, a base station may be mounted on the vehicle and the base station can transmit the vehicle ID number to receivers on all subassemblies moving with the vehicle. Those subassemblies can then store that vehicle ID number in their local memories to show that they were parts on that vehicle at that time.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A method of detecting substantially related objects, comprising:
   a. providing a first wireless sensing device having a first acceleration sensor;
   b. providing a second wireless sensing device having a second acceleration sensor;
   c. obtaining a first signature from the group consisting of a first acceleration signature and a first acceleration spectral signature from said first acceleration sensor and obtaining a second signature from the group consisting of a second acceleration signature and a second acceleration spectral signature from said second acceleration sensor;
   d. providing an input to at least said second wireless sensing device during a time frame, comparing said first signature with said second signature to identify whether said first wireless sensing device also received said input and to determine whether said first signature is substantially related to said second signature; and
   e. identifying said first wireless sensing device as substantially related to said second wireless sensing device if said first signature is substantially related to said second signature.

2. A method as recited in claim 1, wherein in (d) said first signature is from a first time frame and wherein said second signature is from a second time frame, wherein said second time frame corresponds to said first time frame.

3. A method as recited in claim 2, wherein said second time frame is the same as said first time frame.

4. A method as recited in claim 1, wherein said method is for detecting members of a subgroup, wherein (e) comprises identifying said first wireless sensing device as a member of a subgroup if said first signature is substantially related to said second signature.

5. A method as recited in claim 1, wherein said method is for detecting order of objects, wherein (e) comprises identifying order of said first wireless sensing device with respect to said second wireless sensing device based on a property of said first signature and said second signature.

6. A method as recited in claim 1, wherein said second wireless sensing device includes a base station.

7. A method as recited in claim 6, wherein said base station includes a base station transmitter, and wherein said first wireless sensing device includes a first wireless sensing device receiver.

8. A method as recited in claim 7, wherein said first wireless sensing device further comprises a first processor, further comprising the step of transmitting data derived from said second sensor with said base station transmitter and receiving said data derived from said second sensor in said first wireless sensing device receiver, wherein (d) includes comparing said data derived from said first sensor with data derived from said second sensor in said first processor.

9. A method as recited in claim 7, wherein said base station includes a base station receiver and wherein said first wireless sensing device includes a first wireless sensing device transmitter.

10. A method as recited in claim 9, wherein said base station further comprises a base station processor, further comprising the step of transmitting data derived from said first sensor with said first wireless sensing device transmitter and receiving said data derived from said first sensor in said base station receiver, wherein (d) includes comparing said first signature with said second signature in said base station processor.

11. A method as recited in claim 6, wherein said base station includes a transmitter and a receiver.

12. A method as recited in claim 11, wherein said base station further includes a processor, further comprising said base station transmitting a signal to said first wireless device to begin logging data while said base station is logging data.

13. A method as recited in claim 12, further comprising transmitting said second signature to said first wireless device for said comparing in (d).

14. A method as recited in claim 1, wherein said second wireless sensing device comprises a base station, wherein said providing an input involves providing a movement to said base station.

15. A method as recited in claim 14, wherein said input includes an acceleration of said base station.

16. A method as recited in claim 1, further comprising providing a third wireless sensing device having a third sensor and obtaining a third signature from the group consisting of a third acceleration signature and a third spectral acceleration signature, comparing a plurality of points of said third signature with a plurality of points of at least one from the group consisting of said first signature and said second signature during a time frame, and identifying said third wireless sensing device as a member of a subgroup if data from said third signature is substantially related to at least one from the group consisting of said first signature and said second signature during said time frame.

17. A method as recited in claim 1, wherein said first wireless sensing device further includes a transmitter and a memory device, wherein said memory device includes an identity code.

18. A method as recited in claim 1, wherein said first wireless sensing device is connected to at least one from the group, merchandise, a vehicle, a component, a document, and a living thing.

19. A method as recited in claim 18, wherein said vehicle includes a motor vehicle, a trailer or a railroad car.

20. A method as recited in claim 18, wherein said vehicle includes earth moving equipment.

21. A method as recited in claim 18, wherein said document includes a smart staple, wherein said first wireless sensing device is located in said smart staple.

22. A method as recited in claim 18, wherein said first wireless sensing device is located in a bracelet or a necklace for wearing by said living thing.

23. A method as recited in claim 1, wherein (e) further comprises identifying said first and second wireless sensing devices as members of a subgroup if said first signature and said second signature demonstrate that they are heading in about the same direction.

24. A method as recited in claim 1, further comprising a plurality of said first wireless sensing devices, wherein each said first wireless sensing device includes a processor.

25. A method as recited in claim 24, wherein in (a) each of said plurality of first wireless sensing devices further includes a receiver.

26. A method as recited in claim 1, wherein in (a) said first wireless sensing device and said second wireless sensing device each further includes an RFID circuit, wherein said RFID circuit provides an identity code.

27. A method as recited in claim 1, wherein a subgroup includes said first wireless sensing device and said second wireless sensing device, further comprising wirelessly identifying a customer moving with said subgroup.

28. A method as recited in claim 27, wherein said subgroup is located on a platform and wherein the customer generally moves with said platform.

29. A method as recited in claim 28, further comprising identifying the customer to said platform.

30. A method as recited in claim 28, wherein said platform comprises at least one from the group consisting of: a cart, a grocery cart, or a vehicle.

31. A method as recited in claim 27, further comprising listing ES-RFID objects in said subgroup moving with said customer.

32. A method as recited in claim 27, further comprising listing prices with said listing of ES-RFID objects in said subgroup moving with said customer, and providing a sum of said prices.

33. A method as recited in claim 32, further comprising charging said customer based on said price listing.

34. A method as recited in claim 33, further comprising filling up containers of merchandise directly in said platform.

35. A method as recited in claim 1, further comprising providing a platform and mounting said first wireless sensing device and said second wireless sensing device to said platform.

36. A method as recited in claim 35, wherein said platform comprises a grocery cart.

37. A method as recited in claim 35, further comprising providing a trigger signal to initiate data logging by said first wireless sensor device and by said second wireless sensing device.

38. A method as recited in claim 37, further comprising logging data for a period of time long enough to distinguish said first wireless sensor device from said second wireless sensing device.

39. A method as recited in claim 1, further comprising storing data in said first wireless sensing device.

40. A method as recited in claim 39, wherein said data includes data derived from said first sensor.

41. A method as recited in claim 39, wherein said data includes data received from said second wireless sensing device.

42. A method as recited in claim 39, further comprising a base station, wherein said data includes data derived from said base station.

43. A method as recited in claim 39, wherein said data derived from said base station includes information about said first wireless sensing device.

44. A method as recited in claim 43, wherein said information about said first wireless sensing device includes at least one from the group consisting of history of use, wear, association with another assembly, association with a vehicle, association with a structure, accident history, maintenance history, time in service, flight hours, and number of landings.

45. A method as recited in claim 1, wherein said first signature includes a first number of zero crossings and wherein said second signature includes a second number of zero crossings and wherein said first signature has a first spacing between zero crossings and wherein said second signature has a second spacing between corresponding zero crossings, wherein said first signature is determined to be substantially related to said second signature when said first number equals said second number and when said first spacing equals said second spacing.

46. A method as recited in claim 1, wherein said first wireless sensing device is located in an article for wearing by said living thing.

47. A method of detecting substantially related objects and for detecting nearest neighbors, comprising:
  a. providing a first wireless sensing device having a first acceleration sensor;
  b. providing a second wireless sensing device having a second acceleration sensor;
  c. providing a third wireless sensing device having a third acceleration sensor;
  d. obtaining a first signature from the group consisting of a first acceleration signature and a first acceleration spectral signature from said first acceleration sensor, obtaining a second signature from the group consisting of a second acceleration signature and a second acceleration spectral signature from said second acceleration sensor, and obtaining a third signature from the group consisting of a third acceleration signature and a third acceleration spectral signature from said third acceleration sensor;
  e. comparing said first signature with said second signature and determining whether said first signature is substantially related to said second signature, and identifying said first wireless sensing device as a nearest neighbor to said second wireless sensing device if a data point in said first signature is closer in time to a corresponding data point in said second signature than to a corresponding data point in said third signature; and
  f. identifying said first wireless sensing device as substantially related to said second wireless sensing device if said first signature is substantially related to said second signature.

48. A method of detecting substantially related objects, comprising:
  a. providing a first wireless sensing device having a first acceleration sensor;
  b. providing a second wireless sensing device having a second acceleration sensor;
  c. obtaining a first signature from the group consisting of a first acceleration signature and a first acceleration spectral signature from said first acceleration sensor and obtaining a second signature from the group consisting of a second acceleration signature and a second acceleration spectral signature from said second acceleration sensor;
  d. providing an input to at least said second wireless sensor during a time frame, comparing said first signature with said second signature to identify whether said first sensor also received said input and to determine whether said first signature is substantially related to said second signature; and
  e. identifying said first wireless sensing device as substantially related to said second wireless sensing device if said first signature is substantially related to said second signature, and identifying said first and said second wireless sensing devices as members of a subgroup, wherein a signature from each member of said subgroup is substantially related to a signature of another member of said subgroup, further comprising a common platform, wherein each member of said subgroup is located on said common platform.

49. A method as recited in claim 48, wherein (e) comprises identifying a plurality of wireless sensing devices whose data demonstrates that they started moving at about the same time.

50. A method as recited in claim 48, wherein (e) comprises identifying a plurality of wireless sensing devices whose data demonstrates that they started moving from about the same location at about the same time.

51. A method as recited in claim 48, further comprising providing a plurality of said wireless sensing devices on said common platform and providing a movement to said common platform.

52. A method as recited in claim 51, wherein said common platform is part of a vehicle.

53. A method as recited in claim 51, wherein said wireless sensing devices include merchandise, and wherein said common platform is part of a forklift truck.

54. A method of detecting members of a subgroup of objects comprising:
  a. providing a plurality of objects, wherein each object of said plurality of objects includes:
    (1) an identity code;
    (2) an acceleration sensor; and
    (3) a transmitter, wherein said transmitter can transmit said identity code;
  b. providing a substantially common input to a subgroup of said plurality of objects;
  c. obtaining a signature from the group consisting of an acceleration signature and an acceleration spectral signature from said acceleration sensor from each of said plurality of objects;
  d. comparing said signatures from said plurality of objects to identify a member of said subgroup;
  e. transmitting said identity code from said transmitter of each said member of said subgroup; and
  f. receiving and storing said identity code of each said member of said subgroup.

55. A method as recited in claim 54, wherein each said object further comprises a receiver, further comprising transmitting a signature to one of said objects for comparison within said object.

56. A method as recited in claim 55, further comprising providing a base station and transmitting said signature from said base station.

57. A method as recited in claim 55, wherein each said object further comprises a processor, further comprising performing said comparing in said processor.

58. A method as recited in claim 54, wherein said providing a substantially common input to a subgroup of said plurality of objects involves ordinarily using said objects.

59. A method as recited in claim 54, wherein each said signature includes zero crossings, further comprising at least one from the group consisting of counting said zero crossings and determining time between zero crossings.

* * * * *